United States Patent
Wang et al.

(10) Patent No.: US 11,917,173 B2
(45) Date of Patent: Feb. 27, 2024

(54) SUB-PICTURE SIZING IN VIDEO CODING

(71) Applicant: Huawei Technologies Co., Ltd., Shenzhen (CN)

(72) Inventors: Ye-Kui Wang, San Diego, CA (US); FNU Hendry, San Diego, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/370,913

(22) Filed: Jul. 8, 2021

(65) Prior Publication Data

US 2021/0337228 A1 Oct. 28, 2021

Related U.S. Application Data

(63) Continuation of application No. PCT/US2020/012910, filed on Jan. 9, 2020.
(Continued)

(51) Int. Cl.
*H04N 19/436* (2014.01)
*H04N 19/119* (2014.01)
(Continued)

(52) U.S. Cl.
CPC ......... *H04N 19/436* (2014.11); *H04N 19/119* (2014.11); *H04N 19/132* (2014.11); *H04N 19/137* (2014.11); *H04N 19/174* (2014.11); *H04N 19/184* (2014.11); *H04N 19/188* (2014.11); *H04N 19/1883* (2014.11); *H04N 19/44* (2014.11); *H04N 19/593* (2014.11); *H04N 19/176* (2014.11); *H04N 19/31* (2014.11); *H04N 19/70* (2014.11)

(58) Field of Classification Search
CPC ...................................................... H04N 19/44
USPC .................................................... 375/240.25
See application file for complete search history.

(56) References Cited

U.S. PATENT DOCUMENTS

| | | | |
|---|---|---|---|
| 2003/0112867 | A1 | 6/2003 | Hannuksela et al. |
| 2003/0112868 | A1 | 6/2003 | Yan et al. |

(Continued)

FOREIGN PATENT DOCUMENTS

| | | |
|---|---|---|
| CN | 103718551 A | 4/2014 |
| CN | 103975596 A | 8/2014 |

(Continued)

OTHER PUBLICATIONS

"Line Transmission of Non-Telephone Signals, Video Codec for Audiovisual Services at px64 kbits," ITU-T, H.261, Mar. 1993, 29 pages.

(Continued)

*Primary Examiner* — Yulin Sun
(74) *Attorney, Agent, or Firm* — Conley Rose, P.C.

(57) ABSTRACT

A video coding mechanism is disclosed. The mechanism includes receiving a bitstream comprising one or more sub-pictures partitioned from a picture such that each sub-picture includes a sub-picture width that is an integer multiple of a coding tree unit (CTU) size when the each sub-picture includes a right boundary that does not coincide with a right boundary of the picture. The bitstream is parsed to obtain the one or more sub-pictures. The one or more sub-pictures are decoded to create a video sequence. The video sequence is forwarded for display.

18 Claims, 12 Drawing Sheets

Related U.S. Application Data

(60) Provisional application No. 62/790,207, filed on Jan. 9, 2019.

(51) Int. Cl.

| | | |
|---|---|---|
| *H04N 19/132* | (2014.01) | |
| *H04N 19/137* | (2014.01) | |
| *H04N 19/169* | (2014.01) | |
| *H04N 19/174* | (2014.01) | |
| *H04N 19/184* | (2014.01) | |
| *H04N 19/44* | (2014.01) | |
| *H04N 19/593* | (2014.01) | |
| *H04N 19/176* | (2014.01) | |
| *H04N 19/31* | (2014.01) | |
| *H04N 19/70* | (2014.01) | |

(56) References Cited

U.S. PATENT DOCUMENTS

| | | |
|---|---|---|
| 2007/0183676 A1 | 8/2007 | Hannuksela et al. |
| 2010/0080304 A1 | 4/2010 | Reddy et al. |
| 2010/0135384 A1 | 6/2010 | Berkvens et al. |
| 2012/0039386 A1 | 2/2012 | Srinivasamurthy et al. |
| 2013/0016769 A1 | 1/2013 | Chen et al. |
| 2013/0101035 A1 | 4/2013 | Wang et al. |
| 2013/0176389 A1 | 7/2013 | Chen et al. |
| 2013/0202051 A1 | 8/2013 | Zhou |
| 2013/0216146 A1 | 8/2013 | Yu et al. |
| 2013/0266075 A1 | 10/2013 | Wang et al. |
| 2013/0287093 A1 | 10/2013 | Hannuksela et al. |
| 2014/0003493 A1 | 1/2014 | Chen et al. |
| 2014/0003504 A1 | 1/2014 | Ugur et al. |
| 2014/0301464 A1 | 10/2014 | Wu et al. |
| 2014/0362919 A1 | 12/2014 | Zhou et al. |
| 2015/0016504 A1 | 1/2015 | Auyeung et al. |
| 2015/0195577 A1 | 7/2015 | Hannuksela |
| 2015/0222928 A1 | 8/2015 | Tian et al. |
| 2015/0304667 A1 | 10/2015 | Suehring et al. |
| 2015/0365702 A1 | 12/2015 | Deshpande |
| 2016/0027246 A1 | 1/2016 | Newton et al. |
| 2016/0255373 A1 | 9/2016 | Deshpande |
| 2017/0041632 A1 | 2/2017 | Hepper |
| 2018/0270287 A1* | 9/2018 | Ouedraogo ............ H04N 19/17 |
| 2018/0352226 A1 | 12/2018 | An et al. |
| 2018/0376126 A1 | 12/2018 | Hannuksela |
| 2020/0145698 A1 | 5/2020 | Gao et al. |
| 2020/0336762 A1* | 10/2020 | Lee ....................... H04N 19/563 |
| 2021/0037266 A1 | 2/2021 | Nam et al. |
| 2021/0084299 A1* | 3/2021 | Gao ....................... H04N 19/96 |
| 2022/0038737 A1* | 2/2022 | He ....................... H04N 19/174 |
| 2022/0053187 A1* | 2/2022 | Damghanian ........ H04N 19/172 |

FOREIGN PATENT DOCUMENTS

| | | |
|---|---|---|
| EP | 2835969 A1 | 2/2015 |
| JP | 2018078620 A | 5/2018 |
| JP | 2020526145 A | 8/2020 |
| JP | 2021519035 A | 8/2021 |
| JP | 2021153213 A | 9/2021 |
| WO | 2015011339 A1 | 1/2015 |

OTHER PUBLICATIONS

"Transmission of Non-Telephone Signals, Information Technology— Generic Coding of Moving Pictures and Associated Audio Information: Video," H.262, Jul. 1995, 211 pages.

"Series H: Audiovisual and Multimedia Systems, Infrastructure of audiovisual services—Coding of moving video, Video coding for low bit rate communication," ITU-T, H.263, Jan. 2005, 226 pages.

"Series H: Audiovisual and Multimedia Systems, Infrastructure of audiovisual services—Coding of moving video, Advanced video coding for generic audiovisual services," ITU-T, H.264, Jun. 2019, 836 pages.

"Series H: Audiovisual and Multimedia Systesm, Infrastructure of audiovisual services—Coding of moving video, High efficiency video coding," H.265, Apr. 2013, 317 pages.

Bross, B., et al., "Versatile Video Coding (Draft 3)," JVET-L1001-v3, Oct. 3-12, 2018, 181 pages.

Wank, Y.K.., "RTP Payload Format for High Efficiency Video Coding (HEVC)," RFC 7798, Mar. 2016, 86 pages.

JVET-M0536, "AHG12: On picture-level tile and sequence-level tile for VVC," Joint Video Experts Team (JVET) of ITU-T SG 16 WP 3 and ISO/IEC JTC 1/SC 29/WG 11, 13th Meeting: Marrakesh, MO, Jan. 9-18, 2019, 8 pages.

JVET-M0261, "AHG12: On grouping of tiles," Joint Video Experts Team (JVET) of ITU-T SG 16 WP 3 and ISO/IEC JTC 1/SC 29/WG 11, 13th Meeting: Marrakech, MA, Jan. 9-18, 2019, 11 pages.

CTVC-AC1005-v2, "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, 56 pages.

JVET-K0554-v1, Wieckowski, A., et al., "CE1-related: Joint proposal for picture boundary partitioning by Fraunhofer HHI and Huawei", Joint Video Experts Team (JVET) of ITU-T SG 16 WP 3 and ISO/IEC JTC 1/SC 29/WG 11 ,11th Meeting: Ljubljana, SI, Jul. 10-18, 2018, 2 pages.

JVET-M0530, Coban, M., et al., "AHG 12: On signalling of tiles", Joint Video Experts Team (JVET) of ITU-T SG 16 WP 3 and ISO/IEC JTC 1/SC 29/WG 11,13th Meeting: Marrakech, MA, Jan. 9-18, 2019, 4 pages.

JVET-N0107-v1, Wang, Y.K. et al., "AHG12: Sub-picture-based coding for VVC", Joint Video Experts Team (JVET) of ITU-T SG 16 WP 3 and ISO/IEC JTC 1/SC 29/WG 11,14th Meeting: Geneva, CH, Mar. 19-27, 2019, 4 pages.

Document: JCTVC-I0356, Coban, M., et al., "Support of independent sub-pictures," Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, 8 pages.

Document: JVET-P2001-v7, Bross, B., et al., "Versatile Video Coding (Draft 7)", Joint Video Experts Team (JVET) of ITU-SG 16 WP 3 and ISO/IEC JTC 1/SC 29/WG 11 16th Meeting: Geneva, CH, Oct. 1-11, 2019, 473 pages, XP030218453.

Document: JCTVC-I0118, M24357, Zhou, M., et al., "AHG4: Enable parallel decoding with tiles", Joint Collaborative Team on Video Coding (JCT-VC) of ITU-T SG16 WP3 and ISO/IEC JTC1/SC29/WG11, 9th Meeting: Geneva, Switzerland, Apr. 27-May 7, 2012, XP030111881.

Document: JVET-J1001-v2, Bross, B., "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 42 pages, XP030199903.

* cited by examiner

SUB-PICTURE SIZING IN VIDEO CODING

CROSS-REFERENCE TO RELATED APPLICATIONS

This patent application is a continuation of International Application No. PCT/US2020/012910, filed Jan. 9, 2020 by Ye-Kui Wang, et. al., and titled "Sub-picture Sizing In Video Coding," which claims the benefit of U.S. Provisional Patent Application No. 62/790,207, filed Jan. 9, 2019 by Ye-Kui Wang, et. al., and titled "Sub-Pictures in Video Coding," which are hereby incorporated by reference.

TECHNICAL FIELD

The present disclosure is generally related to video coding, and is specifically related to sub-picture management in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a bitstream comprising one or more sub-pictures partitioned from a picture such that a first sub-picture comprises a sub-picture width that includes an incomplete coding tree unit (CTU) when the first sub-picture includes a right boundary that coincides with the right boundary of the picture; parsing, by a processor of the decoder, the bitstream to obtain the one or more sub-pictures; decoding, by the processor, the one or more sub-pictures to create a video sequence; and forwarding, by the processor, the video sequence for display. Some video systems may limit sub-pictures to include heights and widths that are multiples of CTU size. However, may pictures include heights and widths that are not multiples of CTU size. Accordingly, the sub-picture size constraints prevent sub-pictures from operating correctly with many picture layouts. In the disclosed examples, sub-picture widths and sub-picture heights are constrained to be multiples of CTU size. However, these constraints are removed when a sub-picture is positioned at the right boundary of the picture or the bottom boundary of the picture, respectively. By allowing the bottom and right sub-pictures to include heights and widths, respectively, that are not multiples of CTU size, sub-pictures may be used with any picture without causing decoding errors. This results in increasing encoder and decoder functionality. Further, the increased functionality allows an encoder to code pictures more efficiently, which reduces the usage of network resources, memory resources, and/or processing resources at the encoder and the decoder.

Optionally, in any of the preceding aspects, another implementation of the aspect provides, wherein a second sub-picture comprises a sub-picture height that includes an integer number of complete CTUs when the second sub-picture includes a bottom boundary that does not coincide with a bottom boundary of the picture.

Optionally, in any of the preceding aspects, another implementation of the aspect provides, wherein a third sub-picture comprises a sub-picture width that includes an integer number of complete CTUs when the third sub-picture includes a right boundary that does not coincide with a right boundary of the picture.

Optionally, in any of the preceding aspects, another implementation of the aspect provides, wherein a fourth sub-picture comprises a sub-picture height that includes an incomplete CTU when the fourth sub-picture includes a bottom boundary that coincides with the bottom boundary of the picture.

In an embodiment, the disclosure includes a method implemented in a decoder, the method comprising: receiving, by a receiver of the decoder, a bitstream comprising one or more sub-pictures partitioned from a picture such that each sub-picture includes a sub-picture width that is an integer multiple of a coding tree unit (CTU) size when the each sub-picture includes a right boundary that does not coincide with a right boundary of the picture; parsing, by a processor of the decoder, the bitstream to obtain the one or more sub-pictures; decoding, by the processor, the one or more sub-pictures to create a video sequence; and forwarding, by the processor, the video sequence for display. Some video systems may limit sub-pictures to include heights and widths that are multiples of CTU size. However, may pictures include heights and widths that are not multiples of CTU size. Accordingly, the sub-picture size constraints prevent sub-pictures from operating correctly with many picture layouts. In the disclosed examples, sub-picture widths and sub-picture heights are constrained to be multiples of CTU size. However, these constraints are removed when a sub-picture is positioned at the right boundary of the picture or the bottom boundary of the picture, respectively. By allowing the bottom and right sub-pictures to include heights and widths, respectively, that are not multiples of CTU size, sub-pictures may be used with any picture without causing decoding errors. This results in increasing encoder and decoder functionality. Further, the increased functionality allows an encoder to code pictures more efficiently, which reduces the usage of network resources, memory resources, and/or processing resources at the encoder and the decoder.

Optionally, in any of the preceding aspects, another implementation of the aspect provides, wherein each sub-picture includes a sub-picture height that is an integer multiple of the CTU size when the each sub-picture includes a bottom boundary that does not coincide with a bottom boundary of the picture.

Optionally, in any of the preceding aspects, another implementation of the aspect provides, wherein at least one of the sub-pictures includes a sub-picture width that is not an integer multiple of the CTU size when the each sub-picture includes a right boundary that coincides with the right boundary of the picture.

Optionally, in any of the preceding aspects, another implementation of the aspect provides, wherein at least one of the sub-pictures includes a sub-picture height that is not an integer multiple of the CTU size when the each sub-picture includes a bottom boundary that coincides with the bottom boundary of the picture.

Optionally, in any of the preceding aspects, another implementation of the aspect provides, wherein the picture includes a picture width that is not an integer multiple of the CTU size.

Optionally, in any of the preceding aspects, another implementation of the aspect provides, wherein the picture includes a picture height that is not an integer multiple of the CTU size.

Optionally, in any of the preceding aspects, another implementation of the aspect provides, wherein the CTU size is measured in units of luma samples.

In an embodiment, the disclosure includes a method implemented in an encoder, the method comprising: partitioning, by a processor of the encoder, a picture into a plurality of sub-pictures such that each sub-picture includes a sub-picture width that is an integer multiple of a CTU size when the each sub-picture includes a right boundary that does not coincide with a right boundary of the picture; encoding, by the processor, one or more of the sub-pictures into a bitstream; and storing, in a memory of the encoder, the bitstream for communication toward a decoder. Some video systems may limit sub-pictures to include heights and widths that are multiples of CTU size. However, may pictures include heights and widths that are not multiples of CTU size. Accordingly, the sub-picture size constraints prevent sub-pictures from operating correctly with many picture layouts. In the disclosed examples, sub-picture widths and sub-picture heights are constrained to be multiples of CTU size. However, these constraints are removed when a sub-picture is positioned at the right boundary of the picture or the bottom boundary of the picture, respectively. By allowing the bottom and right sub-pictures to include heights and widths, respectively, that are not multiples of CTU size, sub-pictures may be used with any picture without causing decoding errors. This results in increasing encoder and decoder functionality. Further, the increased functionality allows an encoder to code pictures more efficiently, which reduces the usage of network resources, memory resources, and/or processing resources at the encoder and the decoder.

Optionally, in any of the preceding aspects, another implementation of the aspect provides, wherein each sub-picture includes a sub-picture height that is an integer multiple of the CTU size when the each sub-picture includes a bottom boundary that does not coincide with a bottom boundary of the picture.

Optionally, in any of the preceding aspects, another implementation of the aspect provides, wherein at least one of the sub-pictures includes a sub-picture width that is not an integer multiple of the CTU size when the each sub-picture includes a right boundary that coincides with the right boundary of the picture.

Optionally, in any of the preceding aspects, another implementation of the aspect provides, wherein at least one of the sub-pictures includes a sub-picture height that is not an integer multiple of the CTU size when the each sub-picture includes a bottom boundary that coincides with the bottom boundary of the picture.

Optionally, in any of the preceding aspects, another implementation of the aspect provides, wherein the picture includes a picture width that is not an integer multiple of the CTU size.

Optionally, in any of the preceding aspects, another implementation of the aspect provides, wherein the picture includes a picture height that is not an integer multiple of the CTU size.

Optionally, in any of the preceding aspects, another implementation of the aspect provides, wherein the CTU size is measured in units of luma samples.

In an embodiment, the disclosure includes a video coding device comprising: a processor, a memory, a receiver coupled to the processor, and a transmitter coupled to the processor, the processor, memory, receiver, and transmitter configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising one or more sub-pictures partitioned from a picture such that each sub-picture includes a sub-picture width that is an integer multiple of a CTU size when the each sub-picture includes a right boundary that does not coincide with a right border of the picture; a parsing means for parsing the bitstream to obtain the one or more sub-pictures; a decoding means for decoding the one or more sub-pictures to create a video sequence; and a forwarding means for forwarding the video sequence for display.

Optionally, in any of the preceding aspects, another implementation of the aspect provides, wherein the decoder is further configured to perform the method of any of the preceding aspects.

In an embodiment, the disclosure includes an encoder comprising: a partitioning means for partitioning a picture into a plurality of sub-pictures such that each sub-picture includes a sub-picture width that is an integer multiple of a CTU size when the each sub-picture includes a right boundary that does not coincide with a right boundary of the picture; an encoding means for encoding one or more of the sub-pictures into a bitstream; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
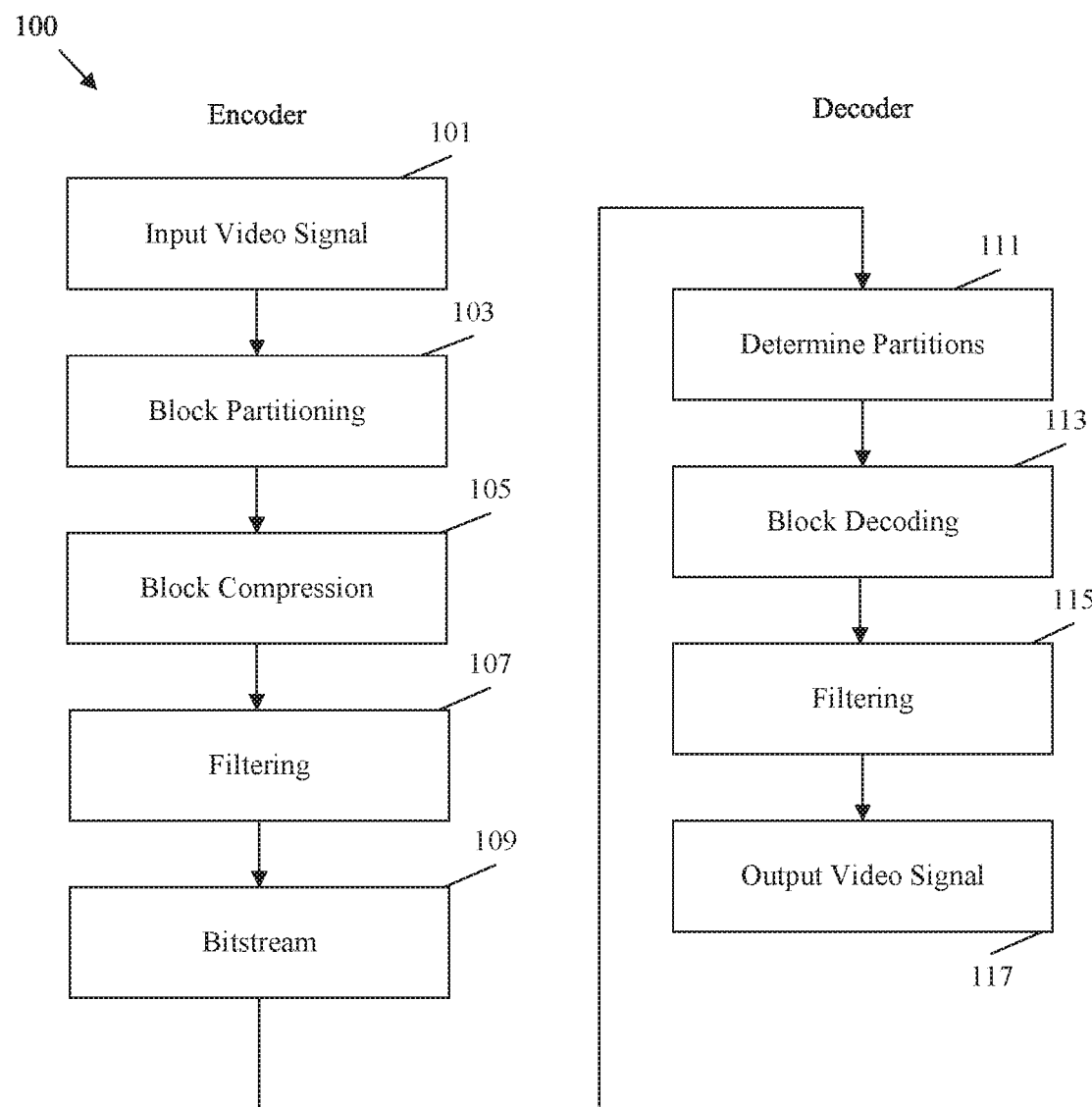
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Various acronyms are employed herein, such as coding tree block (CTB), coding tree unit (CTU), coding unit (CU), coded video sequence (CVS), Joint Video Experts Team (JVET), motion constrained tile set (MCTS), maximum transfer unit (MTU), network abstraction layer (NAL), picture order count (POC), raw byte sequence payload (RBSP), sequence parameter set (SPS), versatile video coding (VVC), and working draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-L1001-v9.

In order to code a video image, the image is first partitioned, and the partitions are coded into a bitstream. Various picture partitioning schemes are available. For example, an image can be partitioned into regular slices, dependent slices, tiles, and/or according to Wavefront Parallel Processing (WPP). For simplicity, HEVC restricts encoders so that only regular slices, dependent slices, tiles, WPP, and combinations thereof can be used when partitioning a slice into groups of CTBs for video coding. Such partitioning can be applied to support Maximum Transfer Unit (MTU) size matching, parallel processing, and reduced end-to-end delay. MTU denotes the maximum amount of data that can be transmitted in a single packet. If a packet payload is in excess of the MTU, that payload is split into two packets through a process called fragmentation.

A regular slice, also referred to simply as a slice, is a partitioned portion of an image that can be reconstructed independently from other regular slices within the same picture, notwithstanding some interdependencies due to loop filtering operations. Each regular slice is encapsulated in its own Network Abstraction Layer (NAL) unit for transmission. Further, in-picture prediction (intra sample prediction, motion information prediction, coding mode prediction) and entropy coding dependency across slice boundaries may be disabled to support independent reconstruction. Such independent reconstruction supports parallelization. For example, regular slice based parallelization employs minimal inter-processor or inter-core communication. However, as each regular slice is independent, each slice is associated with a separate slice header. The use of regular slices can incur a substantial coding overhead due to the bit cost of the slice header for each slice and due to the lack of prediction across the slice boundaries. Further, regular slices may be employed to support matching for MTU size requirements. Specifically, as a regular slice is encapsulated in a separate NAL unit and can be independently coded, each regular slice should be smaller than the MTU in MTU schemes to avoid breaking the slice into multiple packets. As such, the goal of parallelization and the goal of MTU size matching may place contradicting demands to a slice layout in a picture.

Dependent slices are similar to regular slices, but have shortened slice headers and allow partitioning of the image treeblock boundaries without breaking in-picture prediction. Accordingly, dependent slices allow a regular slice to be fragmented into multiple NAL units, which provides reduced end-to-end delay by allowing a part of a regular slice to be sent out before the encoding of the entire regular slice is complete.

A tile is a partitioned portion of an image created by horizontal and vertical boundaries that create columns and rows of tiles. Tiles may be coded in raster scan order (right to left and top to bottom). The scan order of CTBs is local within a tile. Accordingly, CTBs in a first tile are coded in raster scan order, before proceeding to the CTBs in the next tile. Similar to regular slices, tiles break in-picture prediction dependencies as well as entropy decoding dependencies. However, tiles may not be included into individual NAL units, and hence tiles may not be used for MTU size matching. Each tile can be processed by one processor/core, and the inter-processor/inter-core communication employed for in-picture prediction between processing units decoding neighboring tiles may be limited to conveying a shared slice header (when adjacent tiles are in the same slice), and performing loop filtering related sharing of reconstructed samples and metadata. When more than one tile is included in a slice, the entry point byte offset for each tile other than the first entry point offset in the slice may be signaled in the slice header. For each slice and tile, at least one of the following conditions should be fulfilled: 1) all coded treeblocks in a slice belong to the same tile; and 2) all coded treeblocks in a tile belong to the same slice.

In WPP, the image is partitioned into single rows of CTBs. Entropy decoding and prediction mechanisms may use data from CTBs in other rows. Parallel processing is made possible through parallel decoding of CTB rows. For example, a current row may be decoded in parallel with a preceding row. However, decoding of the current row is delayed from the decoding process of the preceding rows by two CTBs. This delay ensures that data related to the CTB above and the CTB above and to the right of the current CTB in the current row is available before the current CTB is coded. This approach appears as a wavefront when represented graphically. This staggered start allows for parallelization with up to as many processors/cores as the image contains CTB rows. Because in-picture prediction between neighboring treeblock rows within a picture is permitted, the inter-processor/inter-core communication to enable in-picture prediction can be substantial. The WPP partitioning does consider NAL unit sizes. Hence, WPP does not support MTU size matching. However, regular slices can be used in conjunction with WPP, with certain coding overhead, to implement MTU size matching as desired.

Tiles may also include motion constrained tile sets. A motion constrained tile set (MCTS) is a tile set designed such that associated motion vectors are restricted to point to full-sample locations inside the MCTS and to fractional-sample locations that require only full-sample locations inside the MCTS for interpolation. Further, the usage of motion vector candidates for temporal motion vector prediction derived from blocks outside the MCTS is disallowed. This way, each MCTS may be independently decoded without the existence of tiles not included in the MCTS. Temporal MCTSs supplemental enhancement information (SEI) messages may be used to indicate the existence of MCTSs in the bitstream and signal the MCTSs. The MCTSs SEI message provides supplemental information that can be used in the MCTS sub-bitstream extraction (specified as part of the semantics of the SEI message) to generate a conforming bitstream for an MCTS set. The information includes a number of extraction information sets, each defining a number of MCTS sets and containing raw bytes sequence payload (RBSP) bytes of the replacement video parameter sets (VPSs), sequence parameter sets (SPSs), and picture parameter sets (PPSs) to be used during the MCTS sub-bitstream extraction process. When extracting a sub-bitstream according to the MCTS sub-bitstream extraction process, parameter sets (VPSs, SPSs, and PPSs) may be rewritten or replaced, and slice headers may updated because one or all of the slice address related syntax elements (including first_slice_segment_in_pic_flag and slice_segment_address) may employ different values in the extracted sub-bitstream.

A picture may also be partitioned into one or more sub-pictures. A sub-picture is a rectangular set of tile groups/slices that begins with a tile group that has a tile_group_address equal to zero. Each sub-picture may refer to a separate PPS and may therefore have a separate tile partitioning. Sub-pictures may be treated like pictures in the decoding process. The reference sub-pictures for decoding a current sub-picture are generated by extracting the area collocated with the current sub-picture from the reference pictures in the decoded picture buffer. The extracted area is treated as a decoded sub-picture. Inter-prediction may take place between sub-pictures of the same size and the same location within the picture. A tile group, also known as a slice, is a sequence of related tiles in a picture or a sub-picture. Several items can be derived to determine a location of the sub-picture in a picture. For example, each current sub-picture may be positioned in the next unoccupied location in CTU raster scan order within a picture that is large enough to contain the current sub-picture within the picture boundaries.

Further, picture partitioning may be based on picture level tiles and sequence level tiles. Sequence level tiles may include the functionality of MCTS, and may be implemented as sub-pictures. For example, a picture level tile may be defined as a rectangular region of coding tree blocks within a particular tile column and a particular tile row in a picture. A sequence level tile may be defined as a set of rectangular regions of coding tree blocks included in different frames where each rectangular region further comprises one or more picture-level tiles and the set of rectangular regions of coding tree blocks are independently decodable from any other set of similar rectangular regions. A sequence level tile group set (STGPS) is a group of such sequence level tiles. The STGPS may be signaled in a non-video coding layer (VCL) NAL unit with an associated identifier (ID) in the NAL unit header.

The preceding sub-picture based partitioning scheme may be associated with certain problems. For example, when sub-pictures are enabled tiling within sub-pictures (partitioning of sub-pictures into tiles) can be used to support parallel processing. Tile partitioning of sub-pictures for parallel processing purposes can change from picture to picture (e.g., for parallel processing load balancing purposes), and therefore may be managed at the picture level (e.g., in the PPS). However, sub-picture partitioning (partitioning of pictures into sub-pictures) may be employed to support region of interest (ROI) and sub-picture based picture access. In such a case, signaling of sub-pictures or MCTS in the PPS is not efficient.

In another example, when any sub-picture in a picture is coded as a temporal motion constrained sub-picture, all sub-pictures in the picture may be coded as temporal motion-constrained sub-pictures. Such picture partitioning may be limiting. For example, coding a sub-picture as a temporal motion-constrained sub-picture may reduce coding efficiency in exchange for additional functionality. However, in region of interest-based applications, usually only one or a few of the sub-pictures use temporal motion-constrained sub-picture based functionality. Hence, the remaining sub-pictures suffer from reduced coding efficiency without providing any practical benefit.

In another example, the syntax elements for specifying the size of a sub-picture may be specified in units of luma CTU sizes. Accordingly, both sub-picture width and height should be an integer multiple of CtbSizeY. This mechanism of specifying sub-picture width and height may result in various issues. For example, sub-picture partitioning is only applicable to pictures with picture width and/or picture height that are an integer multiple of CtbSizeY. This renders sub-picture partitioning as unavailable for pictures that contain dimensions that are not integer multiples of CTbSizeY. If sub-picture partitioning were applied to picture width and/or height when the picture dimension is not an integer multiple of CtbSizeY, the derivation of sub-picture width and/or sub-picture height in luma samples for the right most sub-picture and bottom most sub-picture would be incorrect. Such incorrect derivation would cause erroneous results in some coding tools.

In another example, the location of a sub-picture in a picture may not be signaled. The location is instead derived using the following rule. The current sub-picture is positioned in the next such unoccupied location in CTU raster scan order within a picture that is large enough to contain the sub-picture within the picture boundaries. Deriving sub-picture locations in such a way may cause errors in some cases. For example, if a sub-picture is lost in transmission, then the locations of other sub-pictures are derived incorrectly and the decoded samples are placed at erroneous locations. The same problem applies when the sub-pictures arrive in the wrong order.

In another example, decoding a sub-picture may require extraction of co-located sub-pictures in reference pictures. This may impose additional complexity and resulting burdens in terms of processor and memory resource usage.

In another example, when a sub-picture is designated as a temporal motion constrained sub-picture, loop filters that traverse the sub-picture boundary are disabled. This occurs regardless of whether loop filters that traverse tile boundaries are enabled. Such a constraint may be too restrictive and may result in visual artefacts for video pictures employing multiple of sub-pictures.

In another example, the relationship between the SPS, STGPS, PPS and tile group headers is as follows. The STGPS refers to the SPS, the PPS refers to the STGPS, and the tile group headers/slice headers refer to the PPS. However, the STGPS and the PPS should be orthogonal rather than the PPS referring to the STGPS. The preceding arrangement may also disallow all tile groups of the same picture from referring to the same PPS.

In another example, each STGPS may contain IDs for four sides of a sub-picture. Such IDs are used to identify sub-pictures that share the same border so that their relative spatial relationship can be defined. However, such information may not be sufficient to derive the position and size information for a sequence level tile group set in some cases. In other cases signaling, the position and size information may be redundant.

In another example, an STGPS ID may be signaled in a NAL unit header of a VCL NAL unit using eight bits. This may assist with sub-picture extraction. Such signaling may unnecessarily increase the length of the NAL unit header. Another issue is that unless the sequence level tile group sets are constrained to prevent overlaps, one tile group may be associated with multiple sequence level tile group sets.

Disclosed herein are various mechanisms to address one or more of the abovementioned problems. In a first example, the layout information for sub-pictures is included in an SPS instead of a PPS. Sub-picture layout information includes sub-picture location and sub-picture size. Sub-picture location is an offset between the top left sample of the sub-picture and the top left sample of the picture. Sub-picture size is the height and width of the sub-picture as measured in luma samples. As noted above, some systems include tiling information in the PPS as tiles may change from picture to picture. However, sub-pictures may be used to support ROI applications and sub-picture based access. These functions do not change on a per picture basis. Further, a video sequence may include a single SPS (or one per video segment), and may include as many as one PPS per picture. Placing layout information for sub-pictures in the SPS ensures that the layout is only signaled once for a sequence/segment rather than redundantly signaled for each PPS. Accordingly, signaling sub-picture layout in the SPS increases coding efficiency and hence reduces the usage of network resources, memory resources, and/or processing resources at the encoder and the decoder. Also, some systems have the sub-picture information derived by the decoder. Signaling the sub-picture information reduces the possibility of error in case of lost packets and supports additional functionality in terms of extracting sub-pictures. Accordingly, signaling sub-picture layout in the SPS improves the functionality of an encoder and/or decoder.

In a second example, sub-picture widths and sub-picture heights are constrained to be multiples of CTU size. However, these constraints are removed when a sub-picture is positioned at the right border of the picture or the bottom border of the picture, respectively. As noted above, some video systems may limit sub-pictures to include heights and widths that are multiples of CTU size. This prevents sub-pictures from operating correctly with many picture layouts. By allowing the bottom and right sub-pictures to include heights and widths, respectively, that are not be multiples of CTU size, sub-pictures may be used with any picture without causing decoding errors. This results in increasing encoder and decoder functionality. Further, the increased functionality allows an encoder to code pictures more efficiently, which reduces the usage of network resources, memory resources, and/or processing resources at the encoder and the decoder.

In a third example, sub-pictures are constrained to cover a picture without gap or overlap. As noted above, some video coding systems allow sub-pictures to include gaps and overlaps. This creates the potential for tile groups/slices to be associated with multiple sub-pictures. If this is allowed at the encoder, decoders must be built to support such a coding scheme even when the decoding scheme is rarely used. By disallowing sub-picture gaps and overlaps, the complexity of the decoder can be decreased as the decoder is not required to account for potential gaps and overlaps when determining sub-picture sizes and locations. Further, disallowing sub-picture gaps and overlaps reduces complexity of rate distortion optimization (RDO) processes at the encoder as the encoder can omit considering gap and overlap cases when selecting an encoding for a video sequence. Accordingly, avoiding gaps and overlaps may reduce the usage of memory resources and/or processing resources at the encoder and the decoder.

In a fourth example, a flag can be signaled in the SPS to indicate when a sub-picture is a temporal motion constrained sub-picture. As noted above, some systems may collectively set all sub-pictures to be temporal motion constrained sub-pictures or completely disallow usage of temporal motion constrained sub-pictures. Such temporal motion constrained sub-pictures provide independent extraction functionality at the cost of decreased coding efficiency. However, in region of interest-based applications, the region of interest should be coded for independent extraction while the regions outside of the region of interest do not need such functionality. Hence, the remaining sub-pictures suffer from reduced coding efficiency without providing any practical benefit. Accordingly, the flag allows for a mixture of temporal motion constrained sub-pictures that provide independent extraction functionality and non-motion constrained sub-pictures for increased coding efficiency when independent extraction is not desired. Hence, the flag allows for increased functionality and/or increased coding efficiency, which reduces the usage of network resources, memory resources, and/or processing resources at the encoder and the decoder.

In a fifth example, a complete set of sub-picture IDs are signaled in the SPS, and slice headers include a sub-picture ID indicating the sub-picture that contains the corresponding slices. As noted above, some systems signal sub-picture positions relative to other sub-pictures. This causes a problem if sub-pictures are lost or are separately extracted. By designating each sub-picture by an ID, the sub-pictures can be positioned and sized without reference to other sub-pictures. This in turn supports error correction as well as applications that only extract some of the sub-pictures and avoid transmitting other sub-pictures. A complete list of all sub-picture IDs can be sent in the SPS along with relevant sizing information. Each slice header may contain a sub-picture ID indicating the sub-picture that includes the corresponding slice. In this way, sub-pictures and corresponding slices can be extracted and positioned without reference to other sub-pictures. Hence, the sub-picture IDs support increased functionality and/or increased coding efficiency, which reduces the usage of network resources, memory resources, and/or processing resources at the encoder and the decoder.

In a sixth example, levels are signaled for each sub-picture. In some video coding systems levels are signaled for pictures. A level indicates hardware resources needed to decode the picture. As noted above, different sub-pictures may have different functionality in some cases and hence may be treated differently during the coding process. As such, a picture based level may not be useful for decoding some sub-pictures. Hence, the present disclosure includes levels for each sub-picture. In this way, each sub-picture can be coded independently of other sub-pictures without unnecessarily overtaxing the decoder by setting decoding requirements too high for sub-pictures coded according to less complex mechanisms. The signaled sub-picture level information supports increased functionality and/or increased coding efficiency, which reduces the usage of network resources, memory resources, and/or processing resources at the encoder and the decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
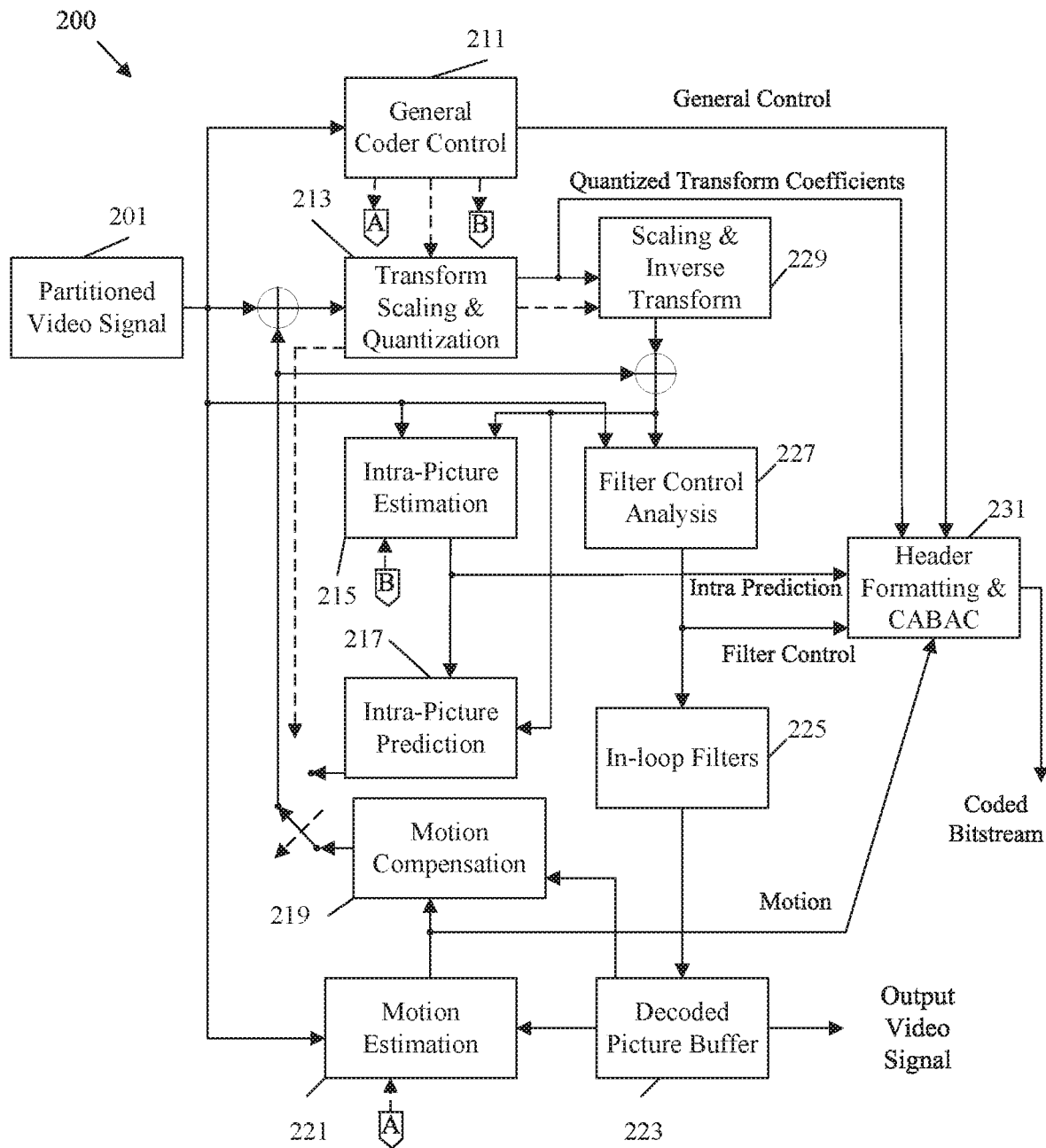
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
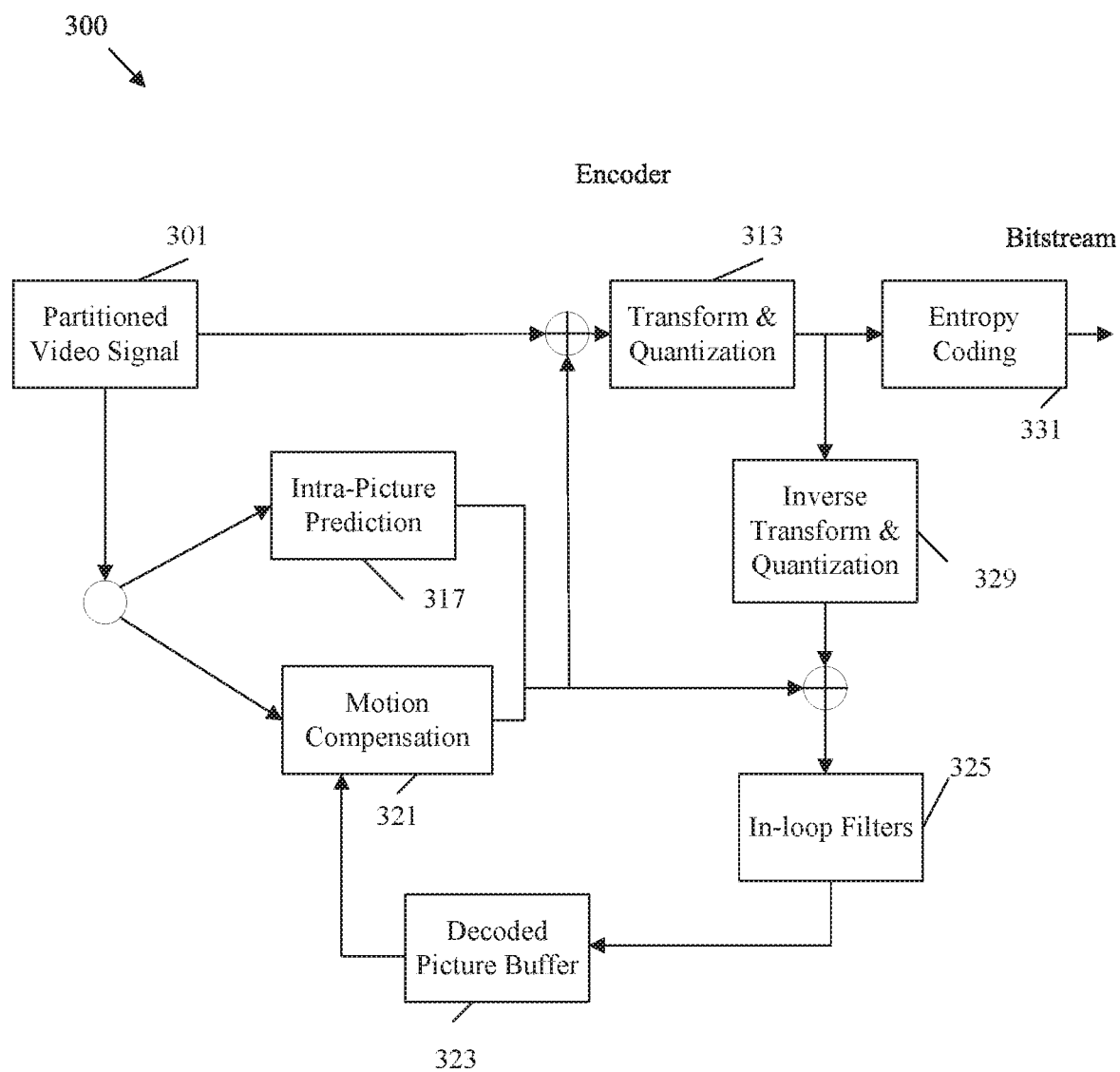
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
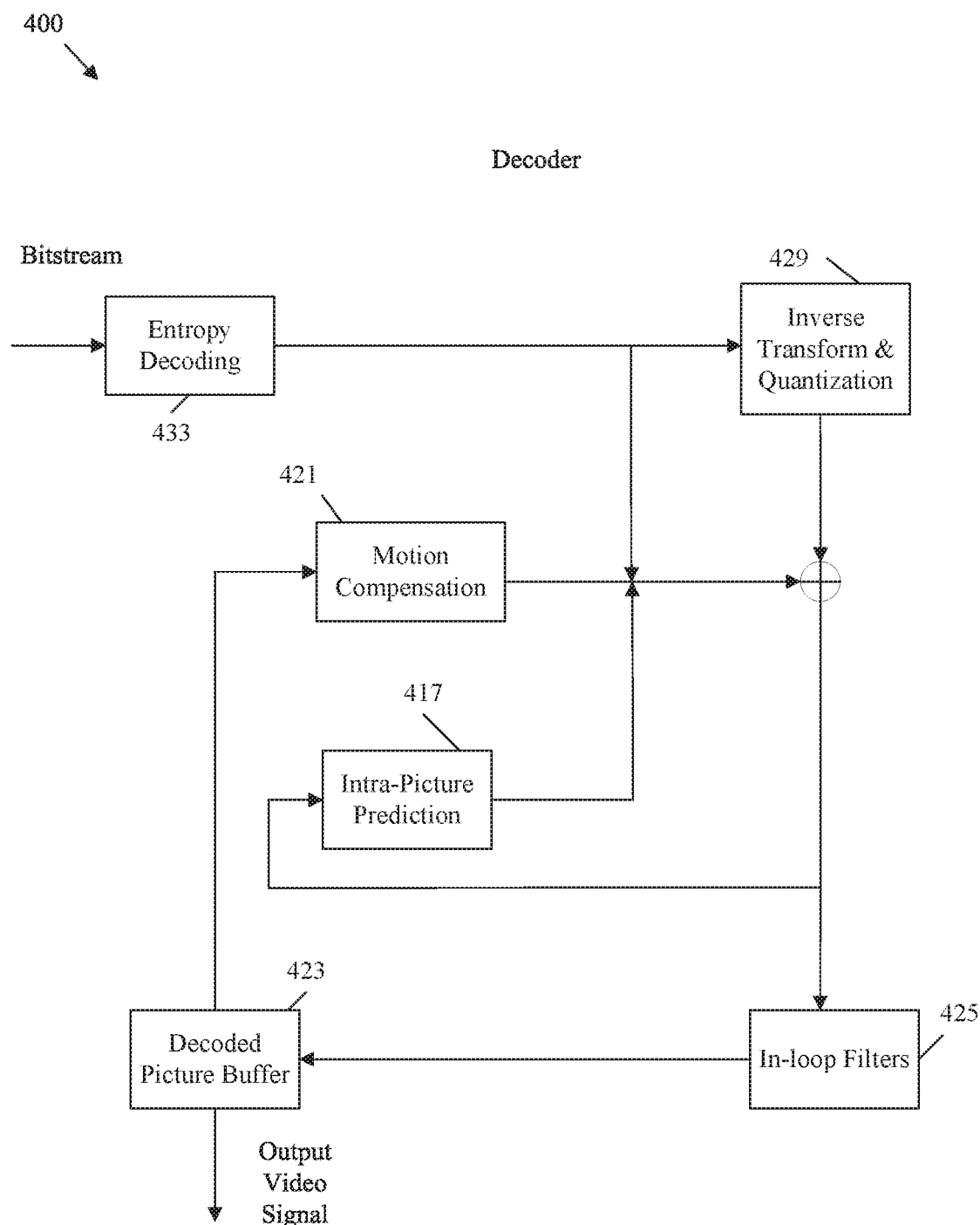
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
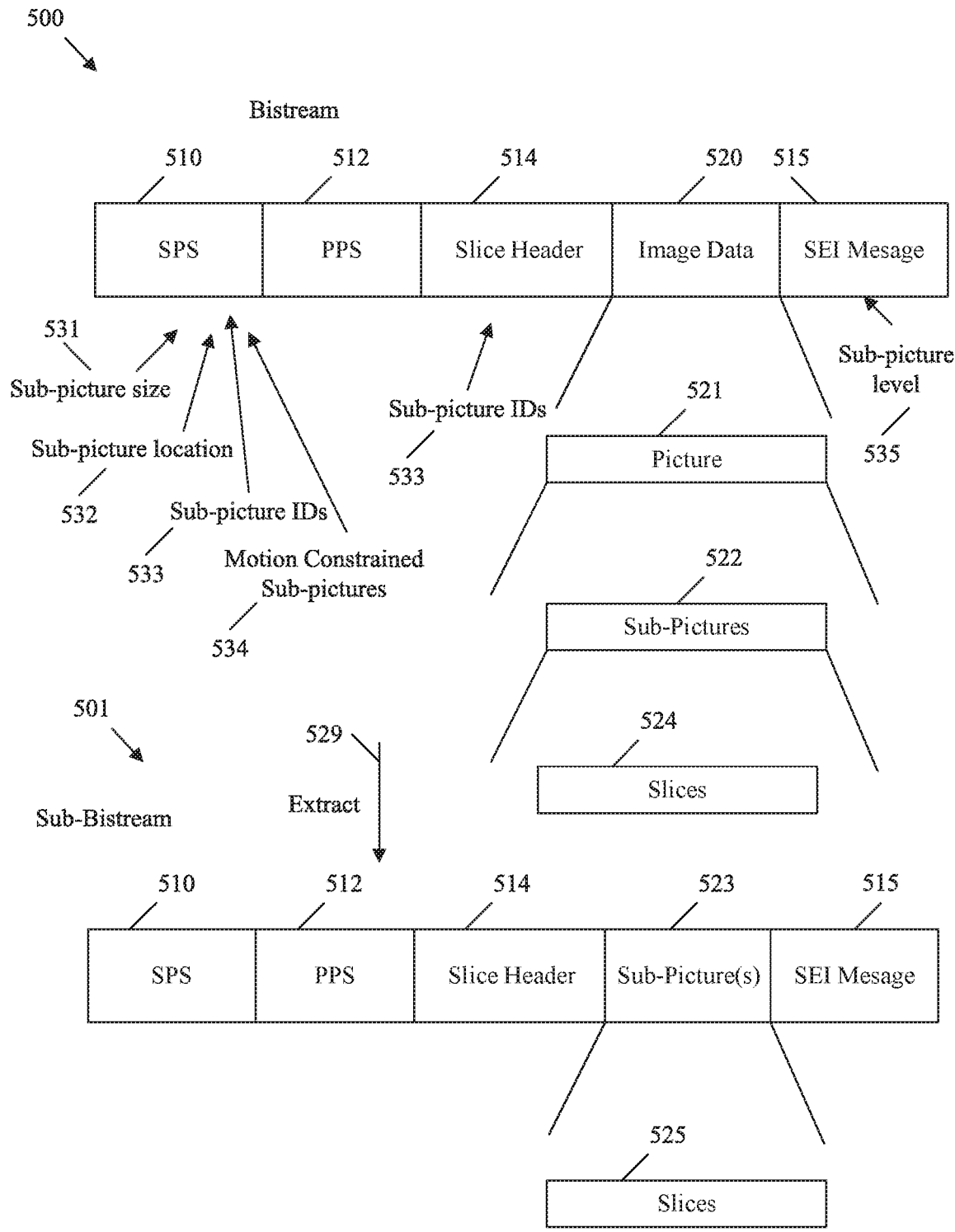
FIG. 5 is a schematic diagram illustrating an example bitstream and sub-bitstream extracted from the bitstream.

FIG. 5 is a schematic diagram illustrating an example bitstream 500 and sub-bitstream 501 extracted from the bitstream 500. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, a plurality of picture parameter sets (PPSs) 512, a plurality of slice headers 514, image data 520, and one or more SEI messages 515. An SPS 510 contains sequence data common to all the pictures in the video sequence contained in the bitstream 500. Such data can include picture sizing, bit depth, coding tool parameters, bit rate restrictions, etc. The PPS 512 contains parameters that are specific to one or more corresponding pictures. Hence, each picture in a video sequence may refer to one PPS 512. The PPS 512 can indicate coding tools available for tiles in corresponding pictures, quantization parameters, offsets, picture specific coding tool parameters (e.g., filter controls), etc. The slice header 514 contains parameters that are specific to one or more corresponding slices 524 in a picture. Hence, each slice 524 in the video sequence may refer to a slice header 514. The slice header 514 may contain slice type information, picture order counts (POCs), reference picture lists, prediction weights, tile entry points, deblocking parameters, etc. In some examples, slices 524 may be referred to as tile groups. In such a case, the slice header 514 may be referred to as a tile group header. SEI messages 515 are optional messages that contain metadata that is not required for block decoding, but can be employed for related purposes such as indicating picture output timing, display settings, loss detection, loss concealment, etc.

The image data 520 contains video data encoded according to inter-prediction and/or intra-prediction as well as corresponding transformed and quantized residual data. Such image data 520 is sorted according to a partitioning used to partition the image prior to encoding. For example, the video sequence is divided into pictures 521. The pictures 521 may be further divided into sub-pictures 522, which are divided into slices 524. The slices 524 may be further divided into tiles and/or CTUs. The CTUs are further divided into coding blocks based on coding trees. The coding blocks can then be encoded/decoded according to prediction mechanisms. For example, a picture 521 can contain one or more sub-pictures 522. A sub-picture 522 may contain one or more slices 524. The picture 521 refers to the PPS 512 and the slices 524 refer to the slice header 514. The sub-pictures 522 may be partitioned consistently over an entire video sequence (also known as a segment), and hence may refer to the SPS 510. Each slice 524 may contain one or more tiles. Each slice 524, and hence picture 521 and sub-picture 522, can also contain a plurality of CTUs.

Each picture 521 may contain an entire set of visual data associated with a video sequence for a corresponding instant in time. However, certain applications may wish to display only a portion of a picture 521 in some cases. For example, a virtual reality (VR) system may display a user selected region of the picture 521, which creates the sensation of being present in the scene depicted in the picture 521. The region a user may wish to view is not known when the bitstream 500 is encoded. Accordingly, the picture 521 may contain each possible region a user may potentially view as sub-pictures 522, which can be decoded and displayed separately based on user input. Other applications may separately display a region of interest. For example, a television with a picture in a picture may wish to display a particular region, and hence a sub-picture 522, from one video sequence over a picture 521 of an unrelated video sequence. In yet another example, teleconferencing systems may display an entire picture 521 of a user that is currently speaking and a sub-picture 522 of a user that is not currently speaking. Accordingly, a sub-picture 522 may contain a defined region of the picture 521. A sub-picture 522 that is temporarily motion constrained can be separately decodable from the rest of the picture 521. Specifically, a temporal motion constrained sub-picture is encoded without reference to samples outside of the temporal motion constrained sub-picture, and hence contains sufficient information for complete decoding without reference to the remainder of the picture 521.

Each slice 524 may be a rectangle defined by a CTU at an upper left corner and a CTU at a bottom right corner. In some examples, a slice 524 includes a series of tiles and/or CTUs in a raster scan order proceeding from left to right and top to bottom. In other examples, a slice 524 is a rectangular slice. A rectangular slice may not traverse the entire width of a picture according to a raster scan order. Instead, a rectangular slice may contain a rectangular and/or square region of a picture 521 and/or sub-picture 522 defined in terms of a CTU and/or tile rows and a CTU and/or tile columns. A slice 524 is the smallest unit that can be separately displayed by a decoder. Hence, slices 524 from a picture 521 may be assigned to different sub-pictures 522 to separately depict desired regions of a picture 521.

A decoder may display one or more sub-pictures 523 of the picture 521. Sub-pictures 523 are a user selected or a pre-defined sub-group of sub-pictures 522. For example, a picture 521 may be divided into nine sub-pictures 522, but the decoder may only display a single sub-picture 523 from the group of sub-pictures 522. The sub-pictures 523 contain slices 525, which are a selected or predefined sub-group of slices 524. To allow for separate display of the sub-pictures 523, a sub-bitstream 501 may be extracted 529 from the bitstream 500. The extraction 529 may occur on the encoder side so that the decoder only receives the sub-bitstream 501. In other cases, the entire bitstream 500 is transmitted to the decoder and the decoder extracts 529 the sub-bitstream 501 for separate decoding. It should be noted that the sub-bitstream 501 may also be referred to generally as a bitstream in some cases. A sub-bitstream 501 includes the SPS 510, the PPS 512, the selected sub-pictures 523, as well as slice headers 514, and SEI messages 515 that are relevant to the sub-pictures 523 and/or slices 525.

The present disclosure signals various data to support efficient coding of the sub-pictures 522 for selection and display of the sub-pictures 523 at the decoder. The SPS 510 includes a sub-picture size 531, a sub-picture location 532, and sub-picture IDs 533 related to the complete set of sub-pictures 522. The sub-picture size 531 includes a sub-picture height in luma samples and a sub-picture width in luma samples for a corresponding sub-picture 522. The sub-picture location 532 includes an offset distance between a top-left sample of a corresponding sub-picture 522 and a top-left sample of the picture 521. The sub-picture location 532 and the sub-picture size 531 define a layout of the corresponding sub-picture 522. The sub-picture ID 533 contains data that uniquely identifies a corresponding sub-picture 522. The sub-picture ID 533 may be a sub-picture 522 raster scan index or other defined value. Hence, a decoder can read the SPS 510 and determine the size, location, and ID of each sub-picture 522. In some video coding systems, data related to sub-pictures 522 may be included in the PPS 512 because a sub-picture 522 is partitioned from a picture 521. However, partitions used to create sub-pictures 522 may be used by applications, such as ROI based applications, VR applications, etc., that depend on consistent sub-picture 522 partitions over a video sequence/segment. As such, sub-picture 522 partitions generally do not change on a per picture basis. Placing layout information for sub-pictures 522 in the SPS 510 ensures that the layout is only signaled once for a sequence/segment rather than redundantly signaled for each PPS 512 (which may be signaled for each picture 521 in some cases). Also, signaling the sub-picture 522 information, instead of relying on the decoder to derive such information, reduces the possibility of error in case of lost packets and supports additional functionality in terms of extracting sub-pictures 523. Accordingly, signaling sub-picture 522 layout in the SPS 510 improves the functionality of an encoder and/or decoder.

The SPS 510 also contains motion constrained sub-pictures flags 534 related to the complete set of sub-pictures 522. The motion constrained sub-pictures flags 534 indicate whether each sub-picture 522 is a temporal motion constrained sub-picture. Hence, the decoder can read the motion constrained sub-pictures flags 534 and determine which of the sub-pictures 522 can be separately extracted and displayed without decoding other sub-pictures 522. This allows selected sub-pictures 522 to be coded as temporal motion constrained sub-pictures while allowing other sub-pictures 522 to be coded without such restrictions for increased coding efficiency.

The sub-picture IDs 533 are also included in the slice headers 514. Each slice header 514 contains data relevant to a corresponding set of slices 524. Accordingly, the slice header 514 contains only the sub-picture IDs 533 corresponding to the slices 524 associated with the slice header 514. As such, a decoder can receive a slice 524, obtain a sub-picture ID 533 from the slice header 514, and determine which sub-picture 522 contains the slice 524. The decoder can also use the sub-picture ID 533 from the slice header 514 to correlate with related data in the SPS 510. As such, the decoder can determine how to position the sub-pictures 522/523 and slices 524/525 by reading the SPS 510 and relevant slice headers 514. This allows the sub-pictures 523 and slices 525 to be decoded even if some sub-pictures 522 are lost in transmission or purposely omitted to increase coding efficiency.

The SEI message 515 may also contain a sub-picture level 535. The sub-picture level 535 indicates hardware resources needed to decode a corresponding sub-picture 522. In this way, each sub-picture 522 can be coded independently of other sub-pictures 522. This ensures each sub-picture 522 can be allocated the correct amount of hardware resources at the decoder. Without such a sub-picture level 535, each sub-picture 522 would be allocated with enough resources to decode the most complex sub-picture 522. Hence, the sub-picture level 535 prevents the decoder from over allocating hardware resources if sub-pictures 522 are associated with varying hardware resource requirements.

Figure 6:
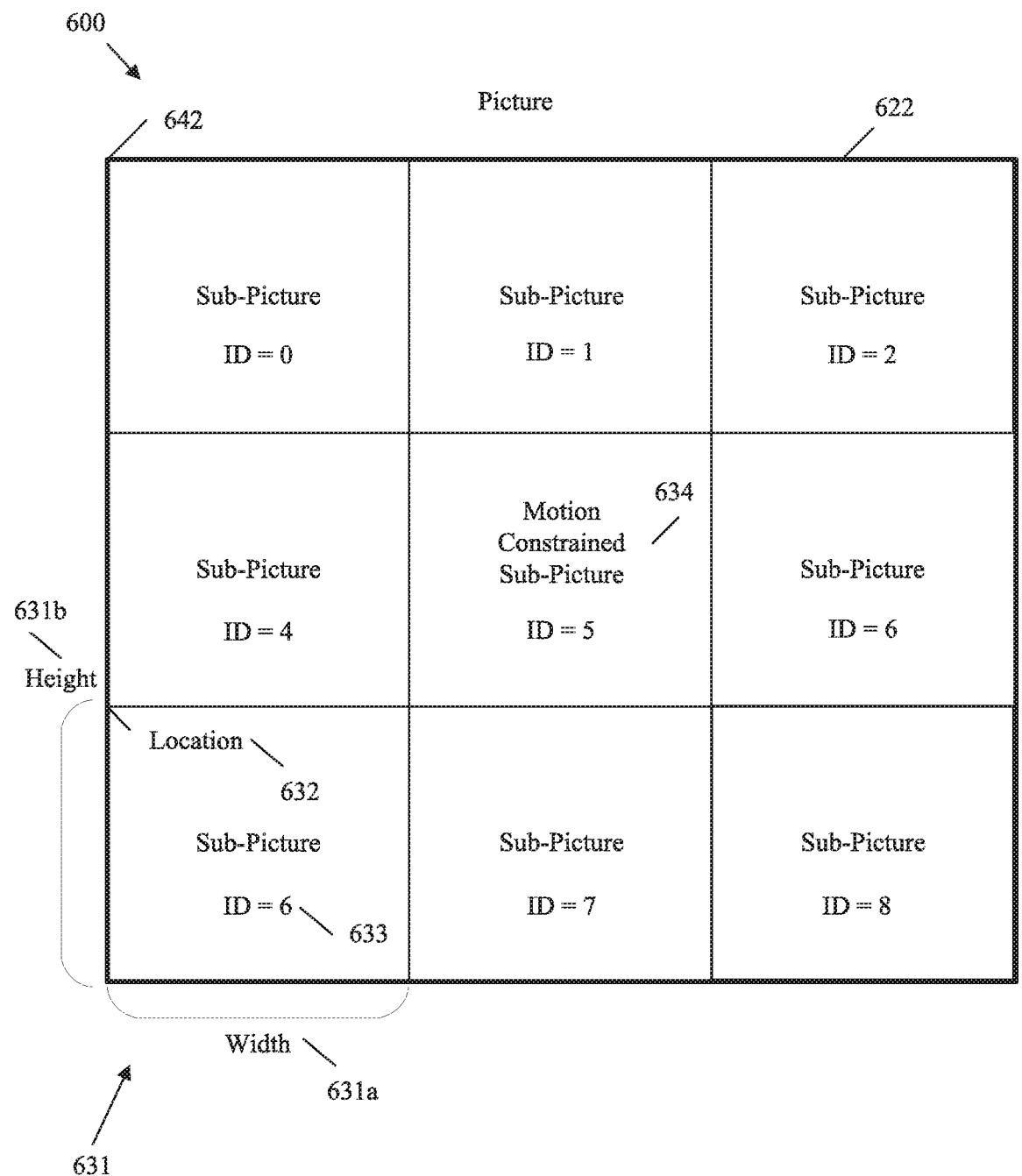
FIG. 6 is a schematic diagram illustrating an example picture partitioned into sub-pictures.

FIG. 6 is a schematic diagram illustrating an example picture 600 partitioned into sub-pictures 622. For example, a picture 600 can be encoded in and decoded from a bitstream 500, for example by a codec system 200, an encoder 300, and/or a decoder 400. Further, the picture 600 can be partitioned and/or included in a sub-bitstream 501 to support encoding and decoding according to method 100.

The picture 600 may be substantially similar to a picture 521. Further, the picture 600 may be partitioned into sub-pictures 622, which are substantially similar to sub-pictures 522. The sub-pictures 622 each include a sub-picture size 631, which may be included in a bitstream 500 as a sub-picture size 531. The sub-picture size 631 includes sub-picture width 631a and a sub-picture height 631b. The sub-picture width 631a is the width of a corresponding sub-picture 622 in units of luma samples. The sub-picture height 631b is the height of a corresponding sub-picture 622 in units of luma samples. The sub-pictures 622 each include a sub-picture ID 633, which may be included in a bitstream 500 as a sub-picture ID 633. The sub-picture ID 633 may be any value that uniquely identifies each sub-picture 622. In the example shown, the sub-picture ID 633 is a sub-picture 622 index. The sub-pictures 622 each include a location 632, which may be included in a bitstream 500 as a sub-picture location 532. The location 632 is expressed as an offset between the top left sample of a corresponding sub-picture 622 and a top left sample 642 of the picture 600.

Also as shown, some sub-pictures 622 may be temporal motion constrained sub-pictures 634 and other sub-pictures 622 may not. In the example shown, the sub-picture 622 with a sub-picture ID 633 of five is a temporal motion constrained sub-picture 634. This indicates that the sub-picture 622 identified as five is coded without reference to any other sub-picture 622 and can therefore be extracted and separately decoded without considering data from the other sub-pictures 622. An indication of which sub-pictures 622 are temporal motion constrained sub-pictures 634 can be signaled in a bitstream 500 in motion constrained sub-pictures flags 534.

As shown, the sub-pictures 622 can be constrained to cover a picture 600 without a gap or an overlap. A gap is a region of a picture 600 that is not included in any sub-picture 622. An overlap is a region of a picture 600 that is included in more than one sub-picture 622. In the example shown in FIG. 6, the sub-pictures 622 are partitioned from the picture 600 to prevent both gaps and overlaps. Gaps cause picture 600 samples to be left out of the sub-pictures 622. Overlaps cause associated slices to be included in multiple sub-pictures 622. Therefore, gaps and overlaps may cause samples to be impacted by differential treatment when sub-pictures 622 are coded differently. If this is allowed at the encoder, a decoder must support such a coding scheme even when the decoding scheme is rarely used. By disallowing sub-picture 622 gaps and overlaps, the complexity of the decoder can be decreased as the decoder is not required to account for potential gaps and overlaps when determining sub-picture sizes 631 and locations 632. Further, disallowing sub-picture 622 gaps and overlaps reduces complexity of RDO processes at the encoder. This is because the encoder can omit considering gap and overlap cases when selecting an encoding for a video sequence. Accordingly, avoiding gaps and overlaps may reduce the usage of memory resources and/or processing resources at the encoder and the decoder.

Figure 7:
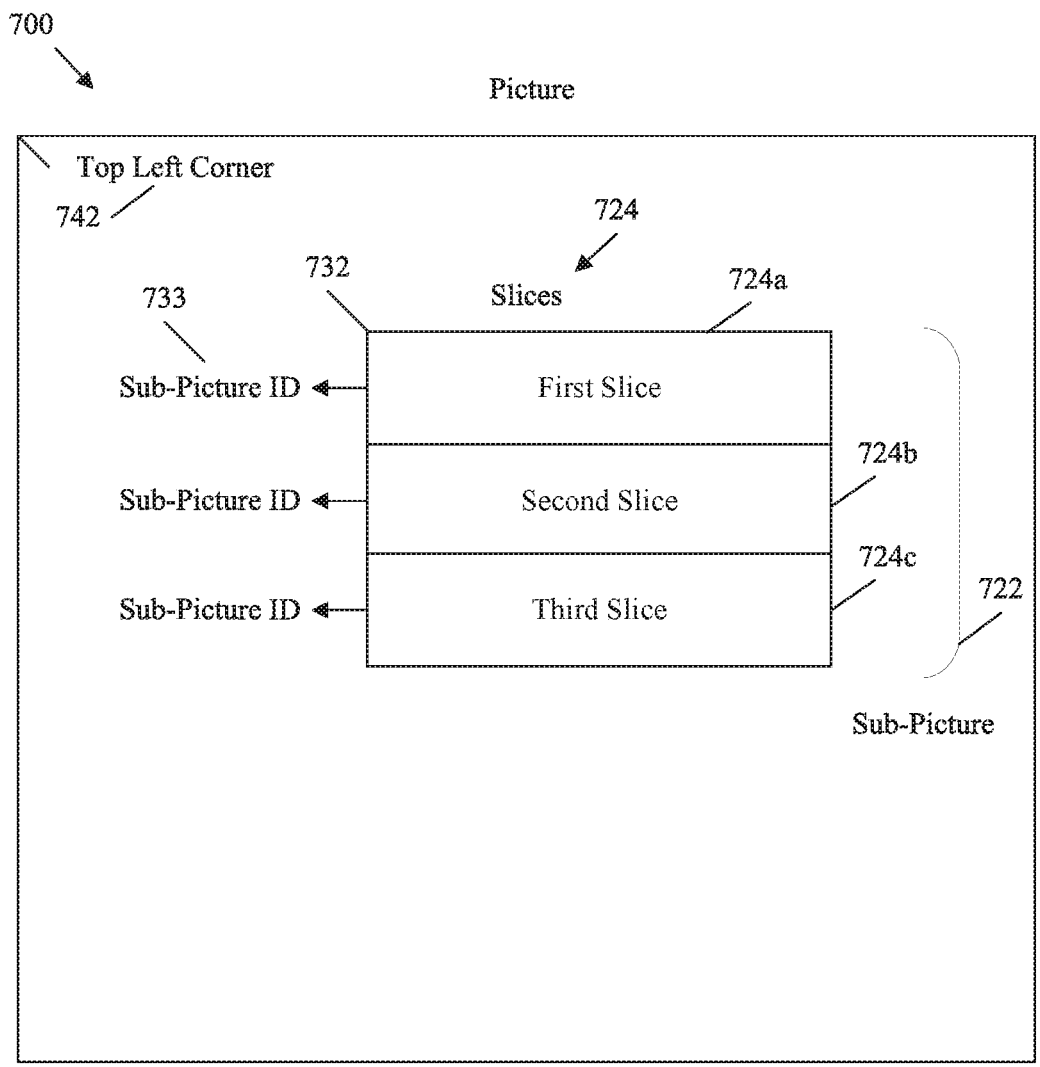
FIG. 7 is a schematic diagram illustrating an example mechanism for relating slices to a sub-picture layout.

FIG. 7 is a schematic diagram illustrating an example mechanism 700 for relating slices 724 to a sub-picture 722 layout. For example, the mechanism 700 may applied to picture 600. Further, mechanism 700 can be applied based on data in a bitstream 500, for example by a codec system 200, an encoder 300, and/or a decoder 400. Further, the mechanism 700 can be employed to support encoding and decoding according to method 100.

The mechanism 700 can be applied to slices 724 in a sub-picture 722, such as slices 524/525 and sub-pictures 522/523, respectively. In the example shown, the sub-picture 722 includes a first slice 724a, a second slice 724b, and a third slice 724c. The slice headers for each of the slices 724 include a sub-picture ID 733 for the sub-picture 722. The decoder can match the sub-picture ID 733 from the slice header with the sub-picture ID 733 in the SPS. The decoder can then determine the location 732 and size of the sub-picture 722 from the SPS based on the sub-picture ID 733. Using the location 732, the sub-picture 722 can be placed relative to the top left sample in the top left corner 742 of the picture. The size can be used to set the height and the width of the sub-picture 722 relative to the location 732. The slices 724 can then be included in the sub-picture 722. Accordingly, the slices 724 can be positioned in the correct sub-picture 722 based on the sub-picture ID 733 without reference to other sub-pictures. This supports error correction as other lost sub-pictures do not alter the decoding of sub-picture 722. This also supports applications that only extract a sub-picture 722 and avoid transmitting other sub-pictures. Hence, the sub-picture IDs 733 support increased functionality and/or increased coding efficiency, which reduces the usage of network resources, memory resources, and/or processing resources at the encoder and the decoder.

Figure 8:
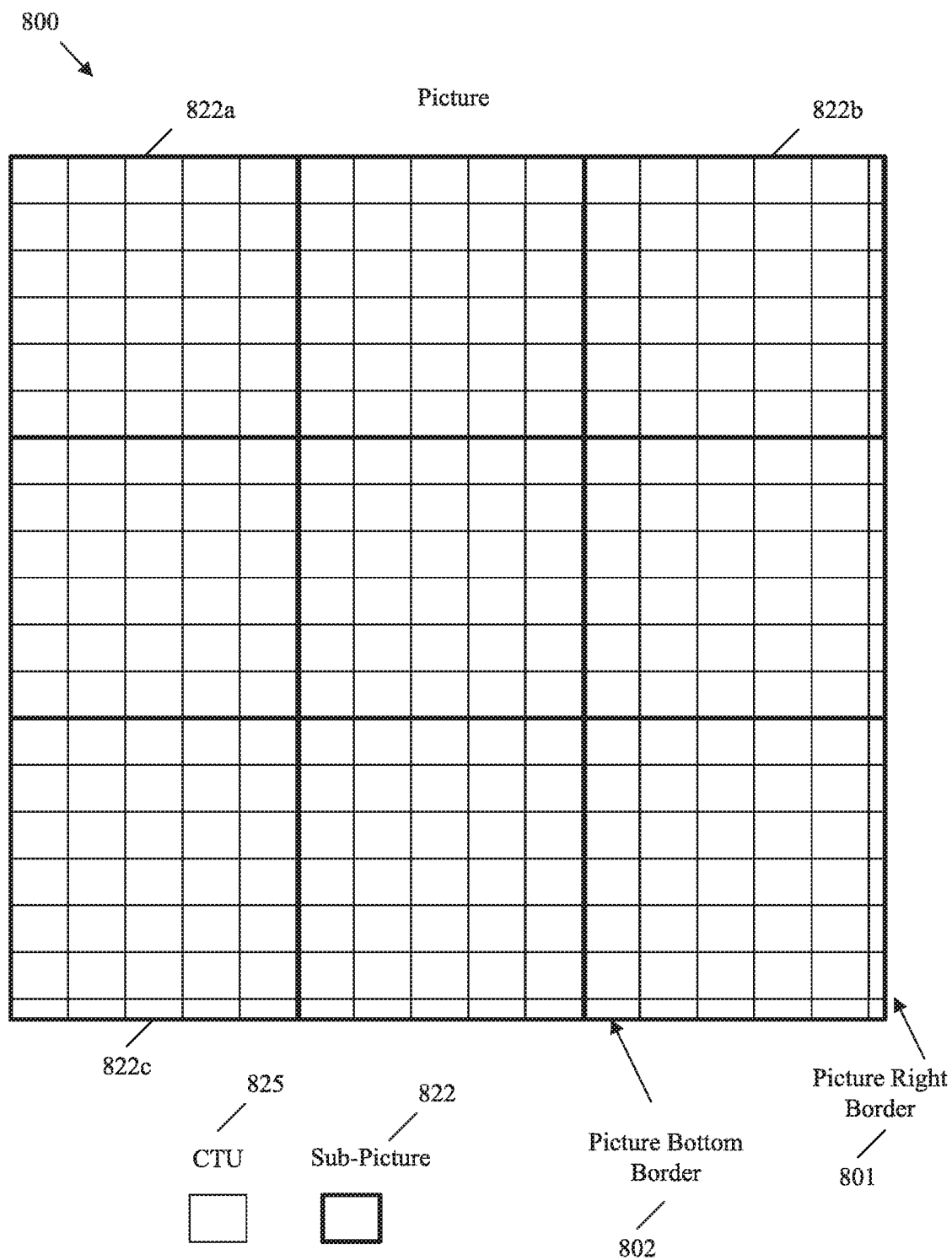
FIG. 8 is a schematic diagram illustrating another example picture partitioned into sub-pictures.

FIG. 8 is a schematic diagram illustrating another example picture 800 partitioned into sub-pictures 822. Picture 800 may be substantially similar to picture 600. In addition, a picture 800 can be encoded in and decoded from a bitstream 500, for example by a codec system 200, an encoder 300, and/or a decoder 400. Further, the picture 800 can be partitioned and/or included in a sub-bitstream 501 to support encoding and decoding according to method 100 and/or mechanism 700.

Picture 800 includes sub-pictures 822, which may be substantially similar to sub-pictures 522, 523, 622, and/or 722. The sub-pictures 822 are divided into a plurality of CTUs 825. A CTU 825 is a basic coding unit in standardized video coding systems. A CTU 825 is sub-divided by a coding tree into coding blocks, which are coded according to inter-prediction or intra-prediction. As shown, some sub-pictures 822a are constrained to include sub-picture widths and sub-picture heights that are multiples of CTU 825 size. In the example shown, sub-pictures 822a have a height of six CTUs 825 and a width of five CTUs 825. This constraint is removed for sub-pictures 822b positioned on the pictures right border 801 and for sub-pictures 822c positioned on the pictures bottom border 802. In the example shown, sub-pictures 822b have a width of between five and six CTUs 825. Hence, sub-pictures 822b have a width of five complete CTUs 825 and one incomplete CTU 825. However, sub-pictures 822b that are not positioned on the pictures bottom border 802 are still constrained to maintain a sub-picture height that is a multiple of CTU 825 size. In the example shown, sub-pictures 822c have a height of between six and seven CTUs 825. Hence, sub-pictures 822c have a height of six complete CTUs 825 and one incomplete CTU 825. However, sub-pictures 822c that are not positioned on the pictures right border 801 are still constrained to maintain a sub-picture width that is a multiple of CTU 825 size. It should be noted that the pictures right border 801 and the pictures bottom border 802 may also be referred to as the pictures right boundary and the pictures bottom boundary, respectively. It should also be noted that the CTU 825 size is a user defined value. The CTU 825 size may be any value between a minimum CTU 825 size and a maximum CTU 825 size. For example, the minimum CTU 825 size may be sixteen luma samples in height and sixteen luma samples in width. Further, the maximum CTU 825 size may be one hundred twenty eight luma samples in height and one hundred twenty eight luma samples in width.

As noted above, some video systems may limit sub-pictures 822 to include heights and widths that are multiples of CTU 825 size. This may prevent sub-pictures 822 from operating correctly with many picture layouts, for example with a picture 800 that contains a total width or height that is not a multiple of CTU 825 size. By allowing the bottom sub-pictures 822c and right sub-pictures 822b to include heights and widths, respectively, that are not multiples of CTU 825 size, sub-pictures 822 may be used with any picture 800 without causing decoding errors. This results in increasing encoder and decoder functionality. Further, the increased functionality allows an encoder to code pictures more efficiently, which reduces the usage of network resources, memory resources, and/or processing resources at the encoder and the decoder.

As described herein, the present disclosure describes designs for sub-picture based picture partitioning in video coding. A sub-picture is a rectangular area within a picture that can be decoded independently using a similar decoding process as is used for a picture. The present disclosure relates to the signaling of sub-pictures in a coded video sequence and/or bitstream as well as the process for sub-picture extraction. The descriptions of the techniques are based on VVC by the JVET of ITU-T and ISO/IEC. However, the techniques also apply to other video codec specifications. The following are example embodiments described herein. Such embodiments can be applied individually or in combination.

Information related to sub-pictures that may be present in the coded video sequence (CVS) may be signaled in a sequence level parameter set, such as an SPS. Such signaling may include the following information. The number of sub-pictures that are present in each picture of the CVS may be signaled in the SPS. In the context of the SPS or a CVS, the collocated sub-pictures for all the access units (AUs) may collectively be referred to as a sub-picture sequence. A loop for further specifying information describing properties of each sub-picture may also be included in the SPS. This information may comprise the sub-picture identification, the location of the sub-picture (e.g., the offset distance between the top-left corner luma sample of the sub-picture and the top-left corner luma sample of the picture), and the size of the sub-picture. In addition, the SPS may signal whether each sub-picture is a motion-constrained sub-picture (containing the functionality of an MCTS). Profile, tier, and level information for each sub-picture may also be signaled or be derivable at the decoder. Such information may be employed to determine profile, tier, and level information for a bitstream created by extracting sub-pictures from the original bitstream. The profile and tier of each sub-picture may be derived to be the same as the entire bitstream's profile and tier. The level for each sub-picture may be signaled explicitly. Such signaling may be present in the loop contained in the SPS. The sequence-level hypothetical reference decoder (HRD) parameters may be signaled in the video usability information (VUI) section of the SPS for each sub-picture (or equivalently, each sub-picture sequence).

When a picture is not partitioned into two or more sub-pictures, the properties of the sub-picture (e.g., location, size, etc.), except the sub-picture ID, may be not present/ signaled in the bitstream. When a sub-picture of pictures in a CVS is extracted, each access unit in the new bitstream may contain no sub-pictures. In this case, the picture in each AU in the new bitstream is not partitioned into multiple sub-pictures. Thus there is no need to signal sub-picture properties such as location and size in the SPS since such information can be derived from the picture properties. However, the sub-picture identification may still be signaled as the ID may be referred to by VCL NAL units/tile groups that are included in the extracted sub-picture. This may allow the sub-picture IDs to remain the same when extracting the sub-picture.

The location of a sub-picture in the picture (x offset and y offset) can be signaled in units of luma samples. The location represents the distance between the top-left corner luma sample of the sub-picture and top-left corner luma sample of the picture. Alternatively, the location of a sub-picture in the picture can be signaled in units of the minimum coding luma block size (MinCbSizeY). Alternatively, the unit of sub-picture location offsets may be explicitly indicated by a syntax element in a parameter set. The unit may be CtbSizeY, MinCbSizeY, luma sample, or other values.

The size of a sub-picture (sub-picture width and sub-picture height) can be signaled in units of luma samples. Alternatively, the size of a sub-picture can be signaled in units of the minimum coding luma block size (MinCbSizeY). Alternatively, the unit of sub-picture size values can be explicitly indicated by a syntax element in a parameter set. The unit may be CtbSizeY, MinCbSizeY, luma sample, or other values. When a sub-picture's right border does not coincide with picture's right border, the sub-picture's width may be required to be an integer multiple of luma CTU size (CtbSizeY). Likewise, when a sub-picture's bottom border does not coincide with picture's bottom border, the sub-picture's height may be required to be an integer multiple of luma CTU size (CtbSizeY). If a sub-picture's width is not an integer multiple of luma CTU size, the sub-picture may be required to be located at a right most position in the picture. Likewise, if a sub-picture's height is not an integer multiple of luma CTU size, the sub-picture may be required to be located at a bottom most position in the picture. In some cases, a sub-picture's width can be signaled in units of luma CTU size, but the width of a sub-picture is not an integer multiple of luma CTU size. In this case, the actual width in luma samples can be derived based on the sub-picture's offset location. The sub-picture's width can be derived based on luma CTU size and the picture's height can be derived based on luma samples. Likewise, a sub-picture's height may be signaled in units of luma CTU size, but the height of the sub-picture is not an integer multiple of luma CTU size. In such a case, the actual height in luma sample can be derived based on the sub-picture's offset location. The sub-picture's height can be derived based on luma CTU size and the picture's height can be derived based on luma samples.

For any sub-picture, the sub-picture ID may be different from the sub-picture index. The sub-picture index may be the index of the sub-picture as signaled in a loop of sub-pictures in the SPS. The sub-picture ID may be the index of the sub-picture in sub-picture raster scan order in the picture. When the value of the sub-picture ID of each sub-picture is the same as the sub-picture index, the sub-picture ID may be signaled or derived. When the sub-picture ID of each sub-picture is different from the sub-picture index, the sub-picture ID is explicitly signaled. The number of bits for signaling of sub-picture IDs may be signaled in the same parameter set that contains sub-picture properties (e.g., in the SPS). Some values for sub-picture ID may be reserved for certain purposes. For example, when tile group headers contain sub-picture IDs to specify which sub-picture contains a tile group, the value zero may be reserved and not used for sub-pictures to ensure that the first few bits of a tile group header are not all zeros to avoid accidental inclusion of an emulation prevention code. In optional cases where sub-pictures of a picture do not cover the whole area of the picture without gap and without overlap, a value (e.g., value one) may be reserved for tile groups that are not part of any sub-picture. Alternatively, the sub-picture ID of the remaining area is explicitly signaled. The number of bits for signaling sub-picture ID may be constrained as follows. The value range should be enough to uniquely identify all sub-pictures in a picture, including the reserved values of sub-picture ID. For example, the minimum number of bits for sub-picture ID can be the value of Ceil(Log 2(number of sub-pictures in a picture+number of reserved sub-picture ID).

It may be constrained that the union of sub-pictures must cover the whole picture without gap and without overlap. When this constraint is applied, for each sub-picture, a flag may be present to specify whether the sub-picture is a motion-constrained sub-picture, which indicates the sub-picture can be extracted. Alternatively, the union of sub-pictures may not cover the whole picture, but overlaps may not be allowed.

Sub-picture IDs may be present immediately after the NAL unit header to assist the sub-picture extraction process without requiring the extractor to parse the remainder of the NAL unit bits. For VCL NAL units, the sub-picture ID may be present in the first bits of tile group headers. For non-VCL NAL unit, the following may apply. For SPS, the sub-picture ID need not be present immediately after the NAL unit header. For PPS, if all tile groups of the same picture are constrained to refer to the same PPS, the sub-picture ID need not be present immediately after its NAL unit header. If tile groups of the same picture are allowed to refer to different PPSs, the sub-picture ID may be present in the first bits of PPS (e.g., immediately after the NAL unit header). In this case, any tile groups of one picture may be allowed to share the same PPS. Alternatively, when tile groups of the same picture are allowed to refer to different PPSs, and different tile group of the same picture are also allowed to share the same PPS, no sub-picture ID may be present in the PPS syntax. Alternatively, when tile groups of the same picture are allowed to refer to different PPSs, and different tile group of the same picture are also allowed to share the same PPS, a list of sub-picture IDs may be present in the PPS syntax. The list indicates the sub-pictures to which the PPS applies. For other non-VCL NAL units, if the non-VCL unit applies to the picture level or above (e.g., access unit delimiter, end of sequence, end of bitstream, etc.), then the sub-picture ID may not be present immediately after the NAL unit header. Otherwise, the sub-picture ID may be present immediately after the NAL unit header.

With the above SPS signaling, the tile partitioning within individual sub-pictures may be signaled in the PPS. Tile groups within the same picture may be allowed to refer to different PPSs. In this case, tile grouping may only be within each sub-picture. The tile grouping concept is partitioning of a sub-picture into tiles.

Alternatively, a parameter set for describing the tile partitioning within individual sub-pictures is defined. Such a parameter set may be called Sub-Picture Parameter Set (SPPS). The SPPS refers to SPS. A syntax element referring to the SPS ID is present in SPPS. The SPPS may contain a sub-picture ID. For sub-picture extraction purposes, the syntax element referring to the sub-picture ID is the first syntax element in SPPS. The SPPS contains a tile structure (e.g., a number of columns, a number of rows, uniform tile spacing, etc.) The SPPS may contain a flag to indicate whether or not a loop filter is enabled across associated sub-picture boundaries. Alternatively, the sub-picture properties for each sub-picture may be signaled in the SPPS instead of in the SPS. Tile partitioning within individual sub-pictures may still be signaled in the PPS. Tile groups within the same picture are allowed to refer to different PPSs. Once an SPPS is activated, the SPPS lasts for a sequence of consecutive AUs in decoding order. However, the SPPS may be deactivated/activated at an AU that is not the start of a CVS. At any moment during the decoding process of a single-layer bitstream with multiple sub-pictures at some AUs, multiple SPPSs may be active. An SPPS may be shared by different sub-pictures of an AU. Alternatively, SPPS and PPS can be merged into one parameter set. In such a case, all tile groups of the same picture may not be required to refer to the same PPS. A constraint may be applied such that all tile groups in the same sub-picture may refer to the same parameter set resulting from the merger between SPPS and PPS.

The number of bits used for signaling sub-picture ID may be signaled in a NAL unit header. When present in a NAL unit header such information may assist sub-picture extraction processes in parsing sub-picture ID value at the beginning of a NAL unit's payload (e.g., the first few bits immediately after NAL unit header). For such signaling, some of the reserved bits (e.g., seven reserved bits) in a NAL unit header may be used to avoid increasing the length of NAL unit header. The number of bits for such signaling may cover the value of sub-picture-ID-bit-len. For example, four bits out of seven reserved bits of a VVCs NAL unit header may be used for this purpose.

When decoding a sub-picture, the location of each coding tree block (e.g., xCtb and yCtb) may be adjusted to an actual luma sample location in the picture instead of a luma sample location in the sub-picture. In this way, extraction of a co-located sub-picture from each reference picture can be avoided as the coding tree block is decoded with reference to the picture instead of the sub-picture. For adjusting the location of a coding tree block, the variables SubpictureXOffset and SubpictureYOffset can be derived based on the sub-picture position (subpic_x_offset and subpic_y_offset). The values of the variables may be added to the values of the luma sample location x and y coordinates, respectively, of each coding tree block in the sub-picture.

A sub-picture extraction process can be defined as follows. The input to the process is the target sub-picture to be extracted. This can be in the form of sub-picture ID or sub-picture location. When the input is a sub-picture's location, the associated sub-picture ID can be resolved by parsing the sub-picture information in the SPS. For non-VCL NAL units, the following apply. Syntax elements in the SPS related to picture size and level may be updated with the sub-picture's size and level information. The following non-VCL NAL units are kept without change: PPS, Access Unit Delimiter (AUD), End of Sequence (EOS), End of Bitstream (EOB), and any other non-VCL NAL units that are applicable to picture level or above. The remaining non-VCL NAL units with sub-picture ID not equal to the target sub-picture ID may be removed. VCL NAL units with sub-picture ID not equal to the target sub-picture ID may also be removed.

A sequence level sub-picture nesting SEI message may be used for nesting of AU-level or sub-picture level SEI messages for a set of sub-pictures. This may include a buffering period, picture timing, and non-HRD SEI messages. The syntax and semantics of this sub-picture nesting SEI message can be as follows. For systems operations, such as in omnidirectional media format (OMAF) environments, a set of sub-picture sequences covering a viewport may be requested and decoded by the OMAF player. Therefore, the sequence level SEI message is used to carry information of a set of sub-picture sequences that collectively cover of a rectangular picture region. The information can be used by systems, and the information is indicative of the required decoding capability as well as the bitrate of the set of sub-picture sequences. The information indicates the level of the bitstream including only the set of sub-picture sequences. This information also indicates the bit rate of the bitstream containing only the set of sub-picture sequences. Optionally, a sub-bitstream extraction process may be specified for a set of sub-picture sequences. The benefit of doing this is the bitstream including only a set of sub-picture sequences can also be conforming. A disadvantage is that in considering different viewport size possibilities there can be many such sets in addition to the already large possible numbers of individual sub-picture sequences.

In an example embodiment, one or more of the disclosed examples may be implemented as follows. A sub-picture may be defined as a rectangular region of one or more tile groups within a picture. An allowed binary split process may be defined as follows. The inputs to this process are: a binary split mode btSplit, a coding block width cbWidth, a coding block height cbHeight, a location (x0, y0) of the top-left luma sample of the considered coding block relative to the top-left luma sample of the picture, a multi-type tree depth mttDepth, a maximum multi-type tree depth with offset maxMttDepth, a maximum binary tree size maxBtSize, and a partition index partIdx. The output of this process is the variable allowBtSplit.

|  | btSplit = = SPLIT_BT_VER | btSplit = = SPLIT_BT_HOR |
|---|---|---|
| parallelTtSplit | SPLIT_TT_VER | SPLIT_TT_HOR |
| cbSize | cbWidth | cbHeight |

Specification of parallelTtSplit and cbSize Based on btSplit.

The variables parallelTtSplit and cbSize are derived as specified above. The variable allowBtSplit is derived as follows. If one or more of the following conditions are true, allowBtSplit is set equal to FALSE: cbSize is less than or equal to MinBtSizeY, cbWidth is greater than maxBtSize, cbHeight is greater than maxBtSize, and mttDepth is greater than or equal to maxMttDepth. Otherwise, if all of the following conditions are true, allowBtSplit is set equal to FALSE: btSplit is equal to SPLIT_BT_VER, and y0+cbHeight is greater than SubPicBottomBorderinPic. Otherwise, if all of the following conditions are true, allowBtSplit is set equal to FALSE, btSplit is equal to SPLIT_BT_HOR, x0+cbWidth is greater than SubPicRightBorderInPic, and y0+cbHeight is less than or equal to SubPicBottomBorderInPic. Otherwise, if all of the following conditions are true, allowBtSplit is set equal to FALSE: mttDepth is greater than zero, partIdx is equal to one, and MttSplitMode[ x0][y0][ mttDepth−1] is equal to parallelTtSplit. Otherwise if all of the following conditions are true, allowBtSplit is set equal to FALSE: btSplit is equal to SPLIT_BT_VER, cbWidth is less than or equal to MaxTb- SizeY, and cbHeight is greater than MaxTbSizeY. Otherwise if all of the following conditions are true, allowBtSplit is set equal to FALSE: btSplit is equal to SPLIT_BT_HOR, cbWidth is greater than MaxTbSizeY, and cbHeight is less than or equal to MaxTbSizeY. Otherwise, allowBtSplit is set equal to TRUE.

An allowed ternary split process may be defined as follows. Inputs to this process are: a ternary split mode ttSplit, a coding block width cbWidth, a coding block height cbHeight, a location (x0, y0) of the top-left luma sample of the considered coding block relative to the top-left luma sample of the picture, a multi-type tree depth mttDepth, a maximum multi-type tree depth with offset maxMttDepth, and a maximum binary tree size maxTtSize. The output of this process is the variable allowTtSplit.

| | ttSplit = = SPLIT_TT_VER | ttSplit = = SPLIT_TT_HOR |
|---|---|---|
| cbSize | cbWidth | cbHeight |

Specification of cbSize Based on ttSplit.

The variable cbSize is derived as specified above. The variable allowTtSplit is derived as follows. If one or more of the following conditions are true, allowTtSplit is set equal to FALSE: cbSize is less than or equal to 2*MinTtSizeY, cbWidth is greater than Min(MaxTbSizeY, maxTtSize), cbHeight is greater than Min(MaxTbSizeY, maxTtSize), mttDepth is greater than or equal to maxMttDepth, x0+cbWidth is greater than SubPicRightBorderInPic, and y0+cbHeight is greater than SubPicBottomBorderInPic. Otherwise, allowTtSplit is set equal to TRUE.

Sequence parameter set RBSP syntax and semantics are as follows.

| | Descriptor |
|---|---|
| seq_parameter_set_rbsp( ) { | |
|   sps_seq_parameter_set_id | ue(v) |
|   pic_width_in_luma_samples | ue(v) |
|   pic_height_in_luma samples | ue(v) |
|   num_subpic_minus1 | ue(v) |
|   subpic_id_len_minus1 | ue(v) |
|   for ( i = 0; i <= num_subpic_minus1; i++ ) { | |
|     subpic_id[ i ] | u(v) |
|     if( num_subpic_minus1 > 0 ){ | |
|       subpic_level_idc[ i ] | u(8) |
|       subpic_x_offset[ i ] | ue(v) |
|       subpic_y_offset[ i ] | ue(v) |
|       subpic_width_in_luma_samples[ i ] | ue(v) |
|       subpic_height_in_luma_samples[ i ] | ue(v) |
|       subpic_motion_constrained_flag[ i ] | u(1) |
|     } | |
|   } | |
| ... | |
| } | |

The pic_width_in_luma_samples specifies the width of each decoded picture in units of luma samples. pic_width_in_luma_samples shall not be equal to zero and shall be an integer multiple of MinCbSizeY. The pic_height_in_luma_samples specifies the height of each decoded picture in units of luma samples. pic_height_in_luma_samples shall not be equal to zero and shall be an integer multiple of MinCbSizeY. The num_subpicture_minus1 plus 1 specifies the number of sub-pictures partitioned in coded pictures belong to the coded video sequence. The subpic_id_len_minus1 plus 1 specifies the number of bits used to represent the syntax element subpic_id[i] in SPS, spps_subpic_id in SPPS referring to the SPS, and tile_group_subpic_id in tile group headers referring to the SPS. The value of subpic_id_len_minus1 shall be in the range of Ceil(Log 2(num_subpic_minus1+2) to eight, inclusive. The subpic_id [i] specifies the sub-picture ID of the i-th sub-picture of pictures referring to the SPS. The length of subpic_id[i] is subpic_id_len_minus1+1 bits. The value of subpic_id[i] shall be greater than zero. The subpic_level_idc[i] indicates a level to which the CVS resulted from extraction of the i-th sub-pictures conforms to specified resource requirements. Bitstreams shall not contain values of subpic_level_idc[i] other than those specified. Other values of subpic_level_idc [i] are reserved. When not present, the value of subpic_level_idc[i] is inferred to be equal to the value of general_level_idc.

The subpic_x_offset[i] specifies the horizontal offset of the top-left corner of the i-th sub-picture relative to the top-left corner of the picture. When not present, the value of subpic_x_offset[i] is inferred to be equal to 0. The value of sub-picture x offset is derived as follows: SubpictureXOffset [i]=subpic_x_offset[i]. The subpic_y_offset[i] specifies the vertical offset of the top-left corner of the i-th sub-picture relative to the top-left corner of the picture. When not present, the value of subpic_y_offset[i] is inferred to be equal to zero. The value of sub-picture y offset is derived as follows: SubpictureYOffset[i]=subpic_y_offset[i]. The subpic_width_in_luma samples[i] specifies the width of the i-th decoded sub-picture for which this SPS is the active SPS. When the sum of SubpictureXOffset[i] and subpic_width_in_luma samples[i] is less than pic_width_in_luma_samples, the value of subpic_width_in_luma samples[i] shall be an integer multiple of CtbSizeY. When not present, the value of subpic_width_in_luma_samples[i] is inferred to be equal to the value of pic_width_in_luma_samples. The subpic_height_in_luma samples[i] specifies the height of the i-th decoded sub-picture for which this SPS is the active SPS. When the sum of SubpictureYOffset[i] and subpic_height_in_luma_samples[i] is less than pic_height_in_luma_samples, the value of subpic_height_in_luma_samples [i] shall be an integer multiple of CtbSizeY. When not present, the value of subpic_height_in_luma_samples[i] is inferred to be equal to the value of pic_height_in_luma_samples.

It is a requirement of bitstream conformance that the union of sub-pictures shall cover the whole area of a picture without overlap and gap. The subpic_motion_constrained_flag[i] equal to one specifies the i-th sub-picture is a temporal-motion constrained sub-picture. The subpic_motion_constrained_flag[i] equal to zero specifies the i-th sub-picture may or may not be a temporal motion-constrained sub-picture. When not present, the value of subpic_motion_constrained_flag is inferred to be equal to zero.

The variables SubpicWidthInCtbsY, SubpicHeightInCtbsY, SubpicSizeInCtbsY, SubpicWidthInMinCbsY, SubpicHeightInMinCbsY, SubpicSizeInMinCbsY, SubpicSizeInSamplesY, SubpicWidthInSamplesC, and SubpicHeightInSamplesC are derived as follows:
SubpicWidthInLumaSamples[i]=subpic_width_in_luma samples[i]
SubpicHeightInLumaSamples[i]=subpic_height_in_luma_samples[i]
SubPicRightBorderInPic[i]=SubpictureXOffset[i]+PicWidthInLumaSamples[i]
SubPicBottomBorderInPic[i]=SubpictureYOffset[i]+PicHeightInLumaSamples[i]
SubpicWidthInCtbsY[i]=Ceil(SubpicWidthInLumaSamples[i]÷CtbSizeY)

SubpicHeightInCtbsY[i]=Ceil(SubpicHeightInLumaSamples[i]÷CtbSizeY)
SubpicSizeInCtbsY[i]=SubpicWidthInCtbsY[i]*SubpicHeightInCtbsY[i]
SubpicWidthInMinCbsY[i]=SubpicWidthInLumaSamples[i]/MinCbSizeY
SubpicHeightInMinCbsY[i]=SubpicHeightInLumaSamples[i]/MinCbSizeY
SubpicSizeInMinCbsY[i]=SubpicWidthInMinCbsY[i]*SubpicHeightInMinCbsY[i]
SubpicSizeInSamplesY[i]=SubpicWidthInLumaSamples[i]*SubpicHeightInLumaSamples[i]
SubpicWidthInSamplesC[i]=SubpicWidthInLumaSamples[i]/SubWidthC
SubpicHeightInSamplesC[i]=SubpicHeightInLumaSamples[i]/SubHeightC The sub-picture parameter set RBSP syntax and semantics are as follows.

| | Descriptor |
|---|---|
| sub_pic_parameter_set_rbsp( ) { | |
|   spps_subpic_id | u(v) |
|   spps_subpic_parameter_set_id | ue(v) |
|   spps_seq_parameter_set_id | ue(v) |
|   single_tile_in_subpic_flag | u(1) |
|   if( !single_tile_in_subpic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     loop_filter_across_tiles_enabled_flag | u(1) |
|   } | |
|   if( loop_filter_across_tiles_enabled_flag ) | |
|     loop_filter_across_subpic_enabled_flag | u(1) |
|   rbsp_trailing_bits( ) | |
| } | |

The spps_subpic_id identifies the sub-picture which the SPPS belongs to. The length of spps_subpic_id is subpic_id_le_nminus1+1 bits. The spps_subpic_parameter_set_id identifies the SPPS for reference by other syntax elements. The value of spps_subpic_parameter_set_id shall be in the range of zero to sixty three, inclusive. The spps_seqparameter_set_id specifies the value of sps_seq_parameter_set_id for the active SPS. The value of spps_seq_parameter_set_id shall be in the range of zero to fifteen, inclusive. The single_tile_in_subpic_flag equal to one specifies that there is only one tile in each sub-picture referring to the SPPS. The single_tile_insubpic_flag equal to zero specifies that there is more than one tile in each sub-picture referring to the SPPS. The num_tile_columns_minus1 plus 1 specifies the number of tile columns partitioning the sub-picture. The num_tile_columns_minus1 shall be in the range of zero to PicWidthInCtbsY[spps_subpic_id]−1, inclusive. When not present, the value of num_tile_columns_minus1 is inferred to be equal to zero. The numt_ile_rows_minus1 plus 1 specifies the number of tile rows partitioning the sub-picture. The num_tile_rows_minus1 shall be in the range of zero to PicHeightInCtbsY[spps_subpic_id]−1, inclusive. When not present, the value of num_tile_rows_minus1 is inferred to be equal to zero. The variable NumTilesInPic is set equal to (num_tile_columns_minus1+1)*(num_tile_rows_minus1+1).

When single_tile_in_subpic_flag is equal to zero, NumTilesInPic shall be greater than zero. The uniform_tile_spacing_flag equal to one specifies that tile column boundaries and likewise tile row boundaries are distributed uniformly across the sub-picture. The uniform_tile_spacing_flag equal to zero specifies that tile column boundaries and likewise tile row boundaries are not distributed uniformly across the sub-picture but signaled explicitly using the syntax elements tile_column_width_minus1[i] and tile_row_height_minus1[i]. When not present, the value of uniform_tile_spacing_flag is inferred to be equal to one. The tile_column_width_minus1[i] plus 1 specifies the width of the i-th tile column in units of CTBs. The tile_row_height_minus1[i] plus 1 specifies the height of the i-th tile row in units of CTBs.

The following variables are derived by invoking the CTB raster and tile scanning conversion process: the list ColWidth[i] for i ranging from zero to num_tile_columns_minus1, inclusive, specifying the width of the i-th tile column in units of CTBs; the list RowHeight[j] for j ranging from zero to num_tile_rows_minus1, inclusive, specifying the height of the j-th tile row in units of CTBs; the list ColBd[i] for i ranging from zero to num_tile_columns_minus1+1, inclusive, specifying the location of the i-th tile column boundary in units of CTBs; the list RowBd[j] for j ranging from zero to num_tile_rows_minus1+1, inclusive, specifying the location of the j-th tile row boundary in units of CTBs; the list CtbAddrRsToTs[ctbAddrRs] for ctbAddrRs ranging from zero to PicSizeInCtbsY−1, inclusive, specifying the conversion from a CTB address in the CTB raster scan of a picture to a CTB address in the tile scan; the list CtbAddrTsToRs[ctbAddrTs] for ctbAddrTs ranging from zero to PicSizeInCtbsY−1, inclusive, specifying the conversion from a CTB address in the tile scan to a CTB address in the CTB raster scan of a picture; the list TileId[ctbAddrTs] for ctbAddrTs ranging from zero to PicSizeInCtbsY−1, inclusive, specifying the conversion from a CTB address in tile scan to a tile ID; the list NumCtusInTile[tileIdx] for tileIdx ranging from zero to PicSizeInCtbsY−1, inclusive, specifying the conversion from a tile index to the number of CTUs in the tile; the list FirstCtbAddrTs[tileIdx] for tileIdx ranging from zero to NumTilesInPic−1, inclusive, specifying the conversion from a tile ID to the CTB address in tile scan of the first CTB in the tile; the list ColumnWidthInLumaSamples[i] for i ranging from zero to num_tile_columns_minus1, inclusive, specifying the width ofthe i-th tile column in units of luma samples; and the list RowHeightInLumaSamples[j] for j ranging from zero to num_tile_rows_minus1, inclusive, specifying the height of the j-th tile row in units of luma samples. The values of ColumnWidthInLumaSamples[i] for i ranging from zero to num_tile_columns_minus1, inclusive, and RowHeightInLumaSamples[j] for j ranging from zero to num_tile_rows_minus1, inclusive, shall all be greater than zero.

The loop_filter_across_tiles_enabled_flag equal to one specifies that in-loop filtering operations may be performed across tile boundaries in sub-pictures referring to the SPPS. The loop_filter_across_tiles_enabled_flag equal to zero specifies that in-loop filtering operations are not performed across tile boundaries in sub-pictures referring to the SPPS. The in-loop filtering operations include the deblocking filter, sample adaptive offset filter, and adaptive loop filter operations. When not present, the value of loop_filter_across_tiles_enabled_flag is inferred to be equal to one. The loop_filter_across_subpic_enabled_flag equal to one specifies that in-loop filtering operations may be performed across sub-picture boundaries in sub-pictures referring to the SPPS. The loop_filter_across_subpic_enabled_flag equal to zero specifies that in-loop filtering operations are not performed across sub-picture boundaries in sub-pictures referring to the SPPS. The in-loop filtering operations include the deblocking filter, sample adaptive offset filter, and adaptive loop filter operations. When not present, the value of loop_filter_across_subpic_enabled_flag is inferred to be equal to the value of loop_filter_across_tiles_enabled_flag.

The general tile group header syntax and semantics are as follows.

|  | Descriptor |
|---|---|
| tile_group_header( ) { |  |
|     tile_group_subpic_id | u(v) |
|     tile_group_subpic_parameter_set_id | u(v) |
|     ... |  |
| } |  |

The value of the tile group header syntax element tile_group_pic_parameter_set_id and tile_group_pic_order_cnt_lsb shall be the same in all tile group headers of a coded picture. The value of the tile group header syntax element tile_group_subpic_id shall be the same in all tile group headers of a coded sub-picture. The tile_group_subpic_id identifies the sub-picture which the tile group belongs to. The length of tile_group_subpic_id is subpic_id_len_minus1+bits. The tile_group_subpic_parameter_set_id specifies the value of spps_subpic_parameter_set_id for the SPPS in use. The value of tile_group_spps_parameter_set_id shall be in the range of zero to sixty three, inclusive.

The following variables are derived and override the respective variables derived from the active SPS:

PicWidthInLumaSamples=SubpicWidthInLumaSamples[tile_group_subpic_id]

PicHeightInLumaSamples=PicHeightInLumaSamples[tile_group_subpic_id]

SubPicRightBorderInPic=SubPicRightBorderInPic[tile_group_subpic_id]

SubPicBottomBorderInPic=SubPicBottomBorderInPic[tile_group_subpic_id]

PicWidthInCtbsY=SubPicWidthInCtbsY[tile_group_subpic_id]

PicHeightInCtbsY=SubPicHeightInCtbsY[tile_group_subpic_id]

PicSizeInCtbsY=SubPicSizeInCtbsY[tile_group_subpic_id]

PicWidthInMinCbsY=SubPicWidthInMinCbsY[tile_group_subpic_id]

PicHeightInMinCbsY=SubPicHeightInMinCbsY[tile_group_subpic_id]

PicSizeInMinCbsY=SubPicSizeInMinCbsY[tile_group_subpic_id]

PicSizeInSamplesY=SubPicSizeInSamplesY[tile_group_subpic_id]

PicWidthInSamplesC=SubPicWidthInSamplesC[tile_group_subpic_id]

PicHeightInSamplesC=SubPicHeightInSamplesC[tile_group_subpic_id]

The coding tree unit syntax is as follows.

|  | Descriptor |
|---|---|
| coding_tree_unit( ) { |  |
|   xCtb = ( CtbAddrInRs % PicWidthInCtbsY |  |
|   ) << CtbLog2SizeY + SubpictureXOffset |  |
|   yCtb = ( CtbAddrInRs / PicWidthInCtbsY |  |
|   ) << CtbLog2SizeY + SubpictureYOffset |  |
|   ... |  |
| } |  |
| dual_tree_implicit_qt_split( x0, y0, log2CbSize, cqtDepth ) { |  |
|   if( log2CbSize > 6 ) { |  |
|     x1 = x0 + ( 1 << ( log2CbSize − 1 ) ) |  |
|     y1 = y0 + ( 1 << ( log2CbSize − 1 ) ) |  |
|     dual_tree_implicit_qt_split( x0, y0, log2CbSize − 1, cqtDepth + 1 ) |  |
|     if( x1 < SubPicRightBorderInPic ) |  |
|       dual_tree_implicit_qt_split( x1, y0, log2CbSize − 1, cqtDepth + 1 ) |  |
|     if( y1 < SubPicBottomBorderInPic ) |  |
|       dual_tree_implicit_qt_split( x0, y1, log2CbSize − 1, cqtDepth + 1 ) |  |
|     if( x1 < SubPicRightBorderInPic && y1 < SubPicBottomBorderInPic ) |  |
|       dual_tree_implicit_qt_split( x1, y1, log2CbSize − 1, cqtDepth + 1 ) |  |
|   } else { |  |
|     coding_quadtree( x0, y0, log2CbSize, cqtDepth, DUAL_TREE_LUMA ) |  |
|     coding_quadtree( x0, y0, log2CbSize, cqtDepth, DUAL_TREE_CHROMA ) |  |
|   } |  |
| } |  |

The coding quadtree syntax and semantics are as follows.

|  | Descriptor |
|---|---|
| coding_quadtree( x0, y0, log2CbSize, cqtDepth, treeType ) { |  |
|   minQtSize = ( treeType = = DUAL_TREE_CHROMA ) ? MinQtSizeC : MinQtSizeY |  |
|   maxBtSize = ( treeType = = DUAL_TREE_CHROMA ) ? MaxBtSizeC : MaxBtSizeY |  |
|   if( ( ( ( x0 + ( 1 << log2CbSize ) <= PicWidthInLumaSamples ) ? 1 : 0 ) + ( ( y0 + ( 1 << log2CbSize ) <= PicHeightInLumaSamples ) ? 1 : 0 ) + ( ( ( 1 << log2CbSize ) <= maxBtSize ) ? 1 : 0 ) ) >= 2 && ( 1 << log2CbSize ) > minQtSize ) |  |
|     qt_split_cu_flag[ x0 ][ y0 ] | ae(v) |
|   if( cu_qp_delta_enabled_flag && cqtDepth <= diff_cu_qp_delta_depth ) { |  |
|     IsCuQpDeltaCoded = 0 |  |
|     CuQpDeltaVal = 0 |  |
|     CuQgTopLeftX = x0 |  |
|     CuQgTopLeftY = y0 |  |
|   } |  |
|   if( qt_split_cu_flag[ x0 ][ y0 ] ) { |  |
|     x1 = x0 + ( 1 << ( log2CbSize − 1 ) ) |  |
|     y1 = y0 + ( 1 << ( log2CbSize − 1 ) ) |  |
|     coding_quadtree( x0, y0, log2CbSize − 1, cqtDepth + 1, treeType ) |  |
|     if( x1 < SubPicRightBorderInPic ) |  |
|       coding_quadtree( x1, y0, log2CbSize − 1, cqtDepth + 1, treeType ) |  |
|     if( y1 < SubPicBottomBorderInPic ) |  |
|       coding_quadtree( x0, y1, log2CbSize − 1, cqtDepth + 1, treeType ) |  |
|     if( x1 < SubPicRightBorderInPic && y1 < SubPicBottomBorderInPic ) |  |
|       coding_quadtree( x1, y1, log2CbSize − 1, cqtDepth + 1, treeType ) |  |
|   } else |  |
|     multi_type_tree( x0, y0, 1 << log2CbSize, 1 << log2CbSize, cqtDepth, 0, 0, 0, treeType ) |  |
| } |  |

The qt_split_cu_flag[x0][y0] specifies whether a coding unit is split into coding units with half horizontal and vertical size. The array indices x0, y0 specify the location (x0, y0) of the top-left luma sample of the considered coding block relative to the top-left luma sample of the picture. When qt_split_cu_flag[x0][y0] is not present, the following applies: If one or more of the following conditions are true, the value of qt_split_cu_flag[x0][y0] is inferred to be equal to one. x0+(1<<log 2CbSize) is greater than SubPicRightBorderInPic and (1<<log 2CbSize) is greater than MaxBtSizeC if treeType is equal to DUAL TREE CHROMA or greater than MaxBtSizeY otherwise. y0+(1<<log 2CbSize) is greater than SubPicBottomBorderInPic and (1<<log 2CbSize) is greater than MaxBtSizeC if treeType is equal to DUAL_TREE_CHROMA or greater than MaxBtSizeY otherwise.

Otherwise, if all of the following conditions are true, the value of qt_split_cu_flag[x0][y0] is inferred to be equal to 1: x0+(1<<log 2CbSize) is greater than SubPicRightBorderInPic, y0+(1<<log 2CbSize) is greater than SubPicBottomBorderInPic, and (1<<log 2CbSize) is greater than MinQtSizeC if treeType is equal to DUAL TREE CHROMA or greater than MinQtSizeY otherwise. Otherwise, the value of qt_split_cu_flag[x0][y0] is inferred to be equal to zero.

The multi-type tree syntax and semantics are as follows.

| | Descriptor |
|---|---|
| multi_type_tree( x0, y0, cbWidth, cbHeight, cqtDepth, mttDepth, depthOffset, partIdx, treeType ) { | |
|   if( ( allowSplitBtVer \|\| allowSplitBtHor \|\| allowSplitTtVer \|\| allowSplitTtHor ) && | |
|     ( x0 + cbWidth <= SubPicRightBorderInPic ) && | |
|     (y0 + cbHeight <= SubPicBottomBorderInPic ) ) | |
|     mtt_split_cu_flag | ae(v) |
|   if( cu_qp_delta_enabled_flag && | |
| ( cqtDepth + mttDepth ) <= diff_cu_qp_delta_depth ) { | |
|     IsCuQpDeltaCoded = 0 | |
|     CuQpDeltaVal = 0 | |
|     CuQgTopLeftX = x0 | |
|     CuQgTopLeftY = y0 | |
|   } | |
|   if( mtt_split_cu_flag ) { | |
|     if( ( allowSplitBtHor \|\| allowSplitTtHor ) && | |
|       ( allowSplitBtVer \|\| allowSplitTtVer ) ) | |
|       mtt_split_cu_vertical_flag | ae(v) |
|     if( ( allowSplitBtVer && allowSplitTtVer && mtt_split_cu_vertical_flag ) \|\| | |
|       ( allowSplitBtHor && allowSplitTtHor && !mtt_split_cu_vertical_flag ) ) | |
|       mtt_split_cu_binary_flag | ae(v) |
|     if( MttSplitMode[ x0 ][ y0 ][ mttDepth ] = = SPLIT_BT_VER ) { | |
|       depthOffset += ( x0 + cbWidth > SubPicRightBorderInPic ) ? 1 : 0 | |
|       x1 = x0 + ( cbWidth / 2 ) | |
|       multi_type_tree( x0, y0, cbWidth / 2, cbHeight, cqtDepth, mttDepth + 1, depthOffset, 0, treeType ) | |
|       if( x1 < SubPicRightBorderInPic ) | |
|         multi_type_tree( x1, y0, cbWidth / 2, cbHeightY, cqtDepth, mttDepth + 1, depthOffset, 1, treeType ) | |
|     } else if( MttSplitMode[ x0 ][ y0 ][ mttDepth ] = = SPLIT_BT_HOR ) { | |
|       depthOffset += (y0 + cbHeight > SubPicBottomBorderInPic ) ? 1 : 0 | |
|       y1 = y0 + ( cbHeight / 2 ) | |
|       multi_type_tree( x0, y0, cbWidth, cbHeight / 2, cqtDepth, mttDepth + 1, depthOffset, 0, treeType ) | |
|       if( y1 < SubPicBottomBorderInPic ) | |
|         multi_type_tree( x0, y1, cbWidth, cbHeight / 2, cqtDepth, mttDepth + 1, depthOffset, 1, treeType ) | |
|     } else if( MttSplitMode[ x0 ][ y0 ][ mttDepth ] = = SPLIT_TT_VER ) { | |
|       x1 = x0 + ( cbWidth / 4 ) | |
|       x2 = x0 + ( 3 * cbWidth / 4 ) | |
|       multi_type_tree( x0, y0, cbWidth / 4, cbHeight, cqtDepth, mttDepth + 1, depthOffset, 0, treeType ) | |
|       multi_type_tree( x1, y0, cbWidth / 2, cbHeight, cqtDepth, mttDepth + 1, depthOffset, 1, treeType ) | |
|       multi_type_tree( x2, y0, cbWidth / 4, cbHeight, cqtDepth, mttDepth + 1, depthOffset, 2, treeType ) | |
|     } else { /* SPLIT_TT_HOR */ | |
|       y1 = y0 + ( cbHeight / 4 ) | |
|       y2 = y0 + ( 3 * cbHeight / 4 ) | |
|       multi_type_tree( x0, y0, cbWidth, cbHeight / 4, cqtDepth, mttDepth + 1, depthOffset, 0, treeType ) | |
|       multi_type_tree( x0, y1, cbWidth, cbHeight / 2, cqtDepth, mttDepth + 1, depthOffset, 1, treeType ) | |
|       multi_type_tree( x0, y2, cbWidth, cbHeight / 4, cqtDepth, mttDepth + 1, depthOffset, 2 , treeType) | |
|     } | |
|   } else | |
|     coding_unit( x0, y0, cbWidth, cbHeight, treeType ) | |
| } | |

The mtt_split_cu_flag equal to zero specifies that a coding unit is not split. The mtt_split_cu_flag equal to one specifies that a coding unit is split into two coding units using a binary split or into three coding units using a ternary split as indicated by the syntax element mtt_split_cu_binary_flag. The binary or ternary split can be either vertical or horizontal as indicated by the syntax element mtt_split_cu_vertical_flag. When mtt_split_cu_flag is not present, the value of mtt_split_cu_flag is inferred as follows. If one or more of the following conditions are true, the value of mtt_split_cu_flag is inferred to be equal to 1: x0+cbWidth is greater than SubPicRightBorderInPic, and y0+cbHeight is greater than SubPicBottomBorderInPic. Otherwise, the value of mtt_split_cu_flag is inferred to be equal to zero.

The derivation process for temporal luma motion vector prediction is as follows. The outputs of this process are: the motion vector prediction mvLXCol in 1/16 fractional-sample accuracy, and the availability flag availableFlagLXCol. The variable currCb specifies the current luma coding block at luma location (xCb, yCb). The variables mvLXCol and availableFlagLXCol are derived as follows. If tile_group_temporal_mvp_enabled_flag is equal to zero, or if the reference picture is the current picture, both components of mvLXCol are set equal to zero and availableFlagLXCol is set equal to zero. Otherwise (tile_group_temporal_mvp_enabled_flag is equal to one and the reference picture is not the current picture), the following ordered steps apply. The bottom right collocated motion vector is derived as follows: xColBr=xCb+cbWidth (8-355) yColBr=yCb+cbHeight (8-356)

If yCb>>CtbLog 2SizeY is equal to yColBr>>CtbLog 2SizeY, yColBr is less than SubPicBottomBorderInPic and xColBr is less than SubPicRightBorderinPic, the following applies. The variable colCb specifies the luma coding block covering the modified location given by ((xColBr>>3)<<3, (yColBr>>3)<<3) inside the collocated picture specified by ColPic. The luma location (xColCb, yColCb) is set equal to the top-left sample of the collocated luma coding block specified by colCb relative to the top-left luma sample of the collocated picture specified by ColPic. The derivation process for collocated motion vectors is invoked with currCb, colCb, (xColCb, yColCb), refIdxLX and sbFlag set equal to zero as inputs, and the output is assigned to mvLXCol and availableFlagLXCol. Otherwise, both components of mvLXCol are set equal to zero and availableFlagLXCol is set equal to zero.

The derivation process for temporal triangle merging candidates is as follows. The variables mvLXColC0, mvLXColC1, availableFlagLXColC0 and availableFlagLXColC1 are derived as follows. If tile_group_temporal_mvp_enabled_flag is equal to zero, both components of mvLXColC0 and mvLXColC1 are set equal to zero and availableFlagLXColC0 and availableFlagLXColC1 are set equal to zero. Otherwise (tile_group_temporal_mvp_enabled_flag is equal to 1), the following ordered steps apply. The bottom right collocated motion vector mvLXColC0 is derived as follows:

xColBr=xCb+cbWidth (8-392)

yColBr=yCb+cbHeight (8-393)

If yCb>>CtbLog 2SizeY is equal to yColBr>>CtbLog 2SizeY, yColBr is less than SubPicBottomBorderInPic and xColBr is less than SubPicRightBorderInPic, the following applies. The variable colCb specifies the luma coding block covering the modified location given by ((xColBr>>3)<<3, (yColBr>>3)<<3) inside the collocated picture specified by ColPic. The luma location (xColCb, yColCb) is set equal to the top-left sample of the collocated luma coding block specified by colCb relative to the top-left luma sample of the collocated picture specified by ColPic. The derivation process for collocated motion vectors is invoked with currCb, colCb, (xColCb, yColCb), refIdxLXCO and sbFlag set equal to zero as inputs, and the output is assigned to mvLXColC0 and availableFlagLXColC0. Otherwise, both components of mvLXColC0 are set equal to zero and availableFlagLXColC0 is set equal to zero.

The derivation process for constructed affine control point motion vector merging candidates is as follows. The fourth (collocated bottom-right) control point motion vector cpMvLXCorner[3], reference index refIdxLXCorner[3], prediction list utilization flag predFlagLXCorner[3] and the availability flag availableFlagCorner[3] with X being 0 and 1 are derived as follows. The reference indices for the temporal merging candidate, refIdxLXCorner[3], with X being zero or one, are set equal to zero. The variables mvLXCol and availableFlagLXCol, with X being zero or one, are derived as follows. If tile_group_temporal_mvp_enabled_flag is equal to zero, both components of mvLXCol are set equal to zero and availableFlagLXCol is set equal to zero. Otherwise (tile_group_temporal_mvp_enabled_flag is equal to one), the following applies:

xColBr=xCb+cbWidth (8-566)

yColBr=yCb+cbHeight (8-567)

If yCb>>CtbLog 2SizeY is equal to yColBr>>CtbLog 2SizeY, yColBr is less than SubPicBottomBorderInPic and xColBr is less than SubPicRightBorderInPic, the following applies. The variable colCb specifies the luma coding block covering the modified location given by ((xColBr>>3)<<3, (yColBr>>3)<<3) inside the collocated picture specified by ColPic. The luma location (xColCb, yColCb) is set equal to the top-left sample of the collocated luma coding block specified by colCb relative to the top-left luma sample of the collocated picture specified by ColPic. The derivation process for collocated motion vectors is invoked with currCb, colCb, (xColCb, yColCb), refIdxLX and sbFlag set equal to zero as inputs, and the output is assigned to mvLXCol and availableFlagLXCol. Otherwise, both components of mvLXCol are set equal to 0 and availableFlagLXCol is set equal to zero. Replace all occurrences of pic_width_in_luma samples with PicWidthInLumaSamples. Replace all occurrences of pic_height_in_luma samples with PicHeightInLumaSamples.

In a second example embodiment, the sequence parameter set RBSP syntax and semantics are as follows.

| | Descriptor |
|---|---|
| seq_parameter_set_rbsp( ) { | |
|   sps_seq_parameter_set_id | ue(v) |
|   pic_width_in_luma_samples | ue(v) |
|   pic_height_in_luma_samples | ue(v) |
|   num_subpic_minus1 | ue(v) |
|   subpic_id_len_minus1 | ue(v) |
|   for ( i = 0; i <= num_subpic_minus1; i++ ) { | |
|     subpic_id[ i ] | u(v) |
|     if( num_subpic_minus1 > 0 ) { | |
|       subpic_level_idc[ i ] | u(8) |
|       subpic_x_offset[ i ] | ue(v) |
|       subpic_y_offset[ i ] | ue(v) |
|       subpic_width_in_luma_samples[ i ] | ue(v) |
|       subpic_height_in_luma_samples[ i ] | ue(v) |
|     } | |
|   } | |
|   ... | |
| } | |

The subpic_id_len_minus1 plus one specifies the number of bits used to represent the syntax element subpic_id[i] in SPS, spps_subpic_id in SPPS referring to the SPS, and tile_group_subpic_id in tile group headers referring to the SPS. The value of subpic_id_len_minus1 shall be in the range of Ceil(Log 2(num_subpic_minus1+3) to eight, inclusive. It is a requirement of bitstream conformance that there shall be no overlap among sub-picture[i] for i from 0 to num_subpic_minus1, inclusive. Each sub-picture may be a temporal motion constrained sub-picture.

The general tile group header semantics are as follows. The tile_group_subpic_id identifies the sub-picture which the tile group belongs to. The length of tile_group_subpic_id is subpic_id_len_minus1+1 bits. The tile_group_subpic_id equal to one indicates the tile group does not belong to any sub-picture.

In a third example embodiment, the NAL unit header syntax and semantics are as follows.

| | Descriptor |
|---|---|
| nal_unit_header( ) { | |
|   forbidden_zero_bit | f(1) |
|   nal_unit_type | u(5) |
|   nuh_temporal_id_plus1 | u(3) |
|   nuh_subpicture_id_len | u(4) |
|   nuh_reserved_zero_4bits | u(3) |
| } | |

The nuh_subpicture_id_len specifies the number of bits used to represent the syntax element specifying sub-picture ID. When the value of nuh_subpicture_id_len is greater than zero, the first nuh_subpicture_id_len-th bits in after nuh_reserved_zero_4bits specifies the ID of the sub-picture which the payload of the NAL unit belongs to. When nuh_subpicture_id_len is greater than zero, the value of nuh_subpicture_id_len shall be equal to the value of subpic_id_len_minus1 in the active SPS. The value of nuh_subpicture_id_len for non-VCL NAL units is constrained as follows. If nal_unit_type is equal to SPS_NUT or PPS_NUT, nuh_subpicture_id_len shall be equal to zero. The nuh_reserved_zero_3bits shall be equal to '000'. Decoders shall ignore (e.g., remove from the bitstream and discard) NAL units with values of nuh_reserved_zero_3bits not equal to '000'.

In a fourth example embodiment, sub-picture nesting syntax is as follows.

|  | Descriptor |
|---|---|
| sub-picture_nesting( payloadSize ) { |  |
|   all_sub_pictures_flag | u(1) |
|   if( !all_sub_pictures_flag ) { |  |
|     nesting_num_sub_pictures_minus1 | ue(v) |
|     for( i = 0; i <= nesting_num_sub_pictures_minus1; i++ ) |  |
|       nesting_sub_picture_id[ i ] | u(v) |
|   } |  |
|   while( !byte_aligned( ) ) |  |
|     sub_picture_nesting_zero_bit /* equal to 0 */ | u(1) |
|   do |  |
|     sei_message( ) |  |
|   while( more_rbsp_data( ) ) |  |
| } |  |

The all_sub_pictures_flag equal to one specifies that the nested SEI messages apply to all the sub-pictures. all_sub_pictures_flag equal to one specifies that the sub-pictures to which the nested SEI messages apply are explicitly signaled by the subsequent syntax elements. The nesting_num_sub_pictures_minus1 plus 1 specifies the number of sub-pictures to which the nested SEI messages apply. The nesting_sub_picture_id[i] indicates the sub-picture ID of the i-th sub-picture to which the nested SEI messages apply. The nesting_sub_picture_id[i] syntax element is represented by Ceil(Log 2(nesting_num_sub_pictures_minus1+1)) bits. The sub_picture_nesting_zero_bit shall be equal to zero.

Figure 9:
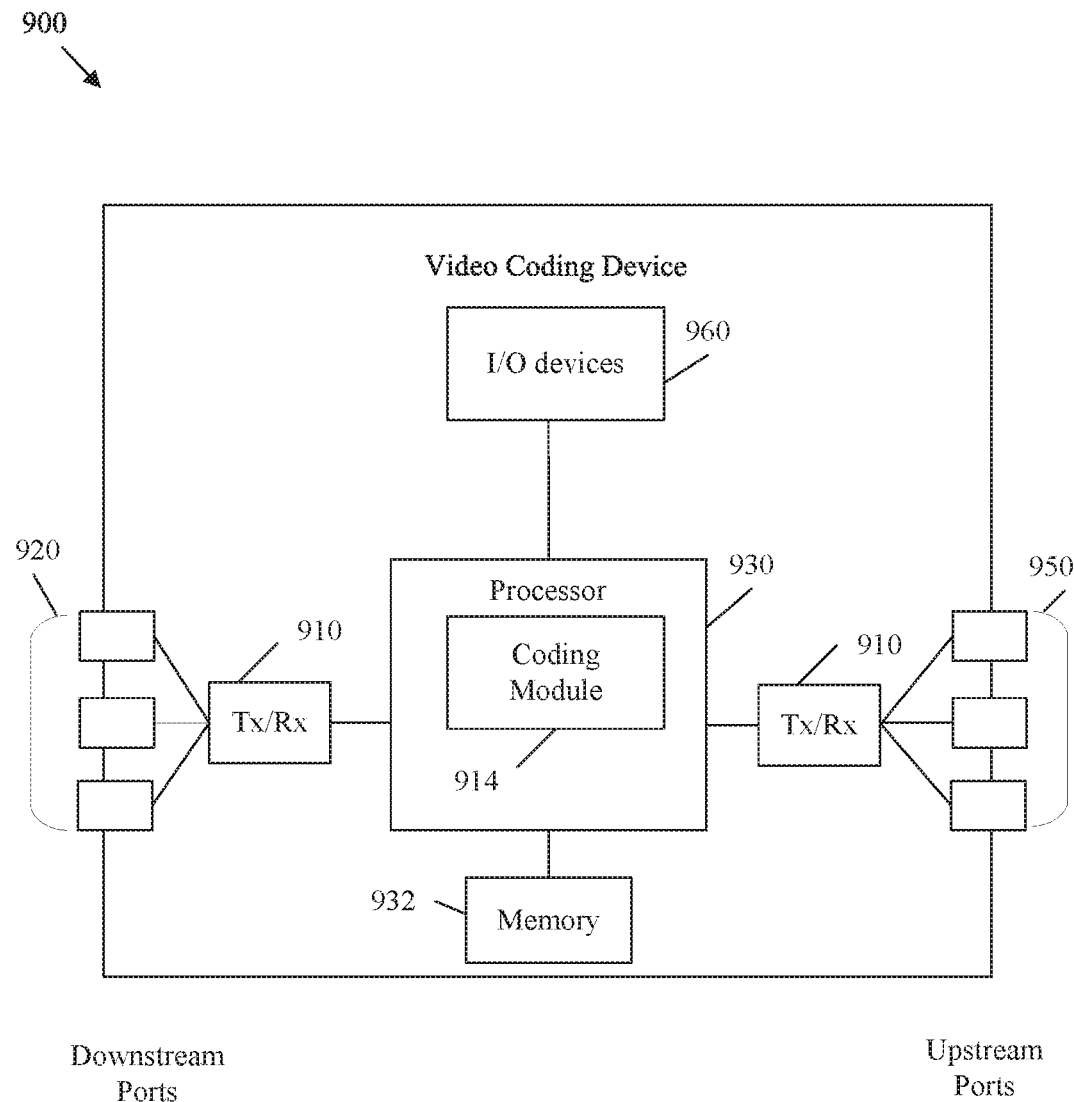
FIG. 9 is a schematic diagram of an example video coding device.

FIG. 9 is a schematic diagram of an example video coding device 900. The video coding device 900 is suitable for implementing the disclosed examples/embodiments as described herein. The video coding device 900 comprises downstream ports 920, upstream ports 950, and/or transceiver units (Tx/Rx) 910, including transmitters and/or receivers for communicating data upstream and/or downstream over a network. The video coding device 900 also includes a processor 930 including a logic unit and/or central processing unit (CPU) to process the data and a memory 932 for storing the data. The video coding device 900 may also comprise electrical, optical-to-electrical (OE) components, electrical-to-optical (EO) components, and/or wireless communication components coupled to the upstream ports 950 and/or downstream ports 920 for communication of data via electrical, optical, or wireless communication networks. The video coding device 900 may also include input and/or output (I/O) devices 960 for communicating data to and from a user. The I/O devices 960 may include output devices such as a display for displaying video data, speakers for outputting audio data, etc. The I/O devices 960 may also include input devices, such as a keyboard, mouse, trackball, etc., and/or corresponding interfaces for interacting with such output devices.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the downstream ports 920, Tx/Rx 910, upstream ports 950, and memory 932. The processor 930 comprises a coding module 914. The coding module 914 implements the disclosed embodiments described above, such as methods 100, 1000, 1100, and/or mechanism 700, which may employ a bitstream 500, a picture 600, and/or a picture 800. The coding module 914 may also implement any other method/mechanism described herein. Further, the coding module 914 may implement a codec system 200, an encoder 300, and/or a decoder 400. For example, the coding module 914 may be employed to signal and/or obtain sub-picture locations and sizes in an SPS. In another example, the coding module 914 may constrain sub-picture widths and sub-picture heights to be multiples of CTU size unless such sub-pictures are positioned at the right border of the picture or the bottom border of the picture, respectively. In another example, the coding module 914 may constrain sub-pictures to cover a picture without gap or overlap. In another example, the coding module 914 may be employed to signal and/or obtain data indicating some sub-pictures are temporal motion constrained sub-pictures and other sub-pictures are not. In another example, the coding module 914 may signal a complete set of sub-picture IDs in the SPS and include a sub-picture ID in each slice header to indicate the sub-picture that contains corresponding slices. In another example, the coding module 914 may signal levels for each sub-picture. As such, the coding module 914 causes the video coding device 900 to provide additional functionality, avoid certain processing to reduce processing overhead, and/or increase coding efficiency when partitioning and coding video data. Accordingly, the coding module 914 improves the functionality of the video coding device 900 as well as addresses problems that are specific to the video coding arts. Further, the coding module 914 effects a transformation of the video coding device 900 to a different state. Alternatively, the coding module 914 can be implemented as instructions stored in the memory 932 and executed by the processor 930 (e.g., as a computer program product stored on a non-transitory medium).

The memory 932 comprises one or more memory types such as disks, tape drives, solid-state drives, read only memory (ROM), random access memory (RAM), flash memory, ternary content-addressable memory (TCAM), static random-access memory (SRAM), etc. The memory 932 may be used as an over-flow data storage device, to store programs when such programs are selected for execution, and to store instructions and data that are read during program execution.

Figure 10:
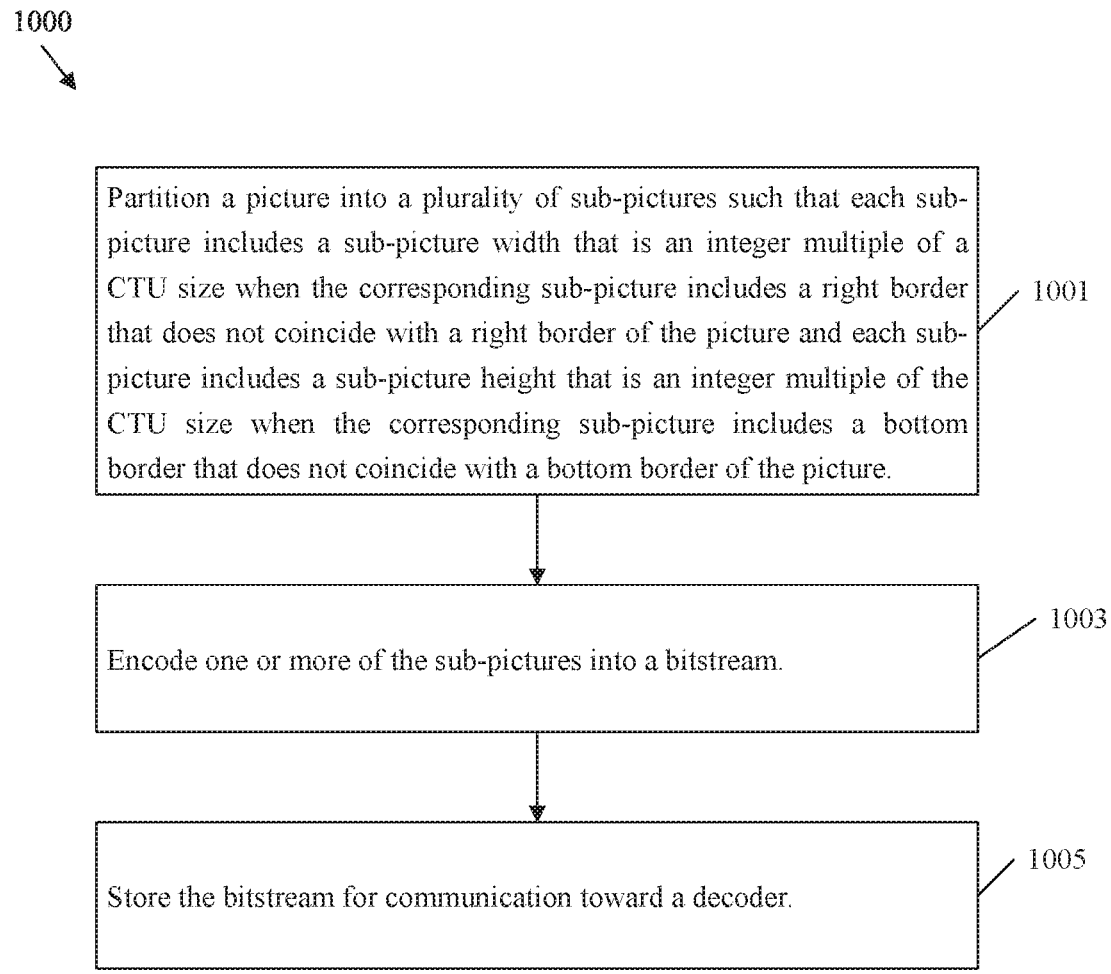
FIG. 10 is a flowchart of an example method of encoding a bitstream of sub-pictures with adaptive size constraints.

FIG. 10 is a flowchart of an example method 1000 of encoding a bitstream, such as bitstream 500 and/or sub-bitstream 501, of sub-pictures, such as sub-pictures 522, 523, 622, 722, and/or 822, with adaptive size constraints. Method 1000 may be employed by an encoder, such as a codec system 200, an encoder 300, and/or a video coding device 900 when performing method 100.

Method 1000 may begin when an encoder receives a video sequence including a plurality of pictures and determines to encode that video sequence into a bitstream, for example based on user input. The video sequence is partitioned into pictures/images/frames for further partitioning prior to encoding. At step 1001, a picture is partitioned into a plurality of sub-pictures. An adaptive size constraint is applied when partitioning the sub-pictures. The sub-pictures each include a sub-picture width and a sub-picture height. When a current sub-picture includes a right border that does not coincide with a right border of the picture, the sub-picture width of the current sub-picture is constrained to be an integer multiple of a CTU (e.g., sub-pictures 822 other than 822b). Accordingly, at least one of the sub-pictures (e.g., sub-pictures 822*b*) may include a sub-picture width that is not an integer multiple of the CTU size when the each sub-picture includes a right border that coincides with the right border of the picture. Further, when a current sub-picture includes a bottom border that does not coincide with a bottom border of the picture, the sub-picture height of the current sub-picture is constrained to be an integer multiple of a CTU (e.g., sub-pictures 822 other than 822*c*). Accordingly, at least one of the sub-pictures (e.g., sub-pictures 822*c*) may include a sub-picture height that is not an integer multiple of the CTU size when the each sub-picture includes a bottom border that coincides with the bottom border of the picture. This adaptive size constraint allows sub-pictures to be partitioned from a picture that includes a picture width that is not an integer multiple of the CTU size and/or a picture height that is not an integer multiple of the CTU size. The CTU size may be measured in units of luma samples.

At step 1003, the one or more of the sub-pictures are encoded into a bitstream. The bitstream is stored for communication toward a decoder at step 1005. The bitstream may then be transmitted toward the decoder as desired. In some examples, a sub-bitstream may be extracted from the encoded bitstream. In such a case, the transmitted bitstream is a sub-bitstream. In other examples, the encoded bitstream may be transmitted for sub-bitstream extraction at the decoder. In yet other examples, the encoded bitstream may be decoded and displayed without sub-bitstream extraction. In any of these examples, the adaptive size constraint allows sub-pictures to be partitioned from a picture with a height or width that is not a multiple of CTU size, and hence increases the functionality of the encoder.

Figure 11:
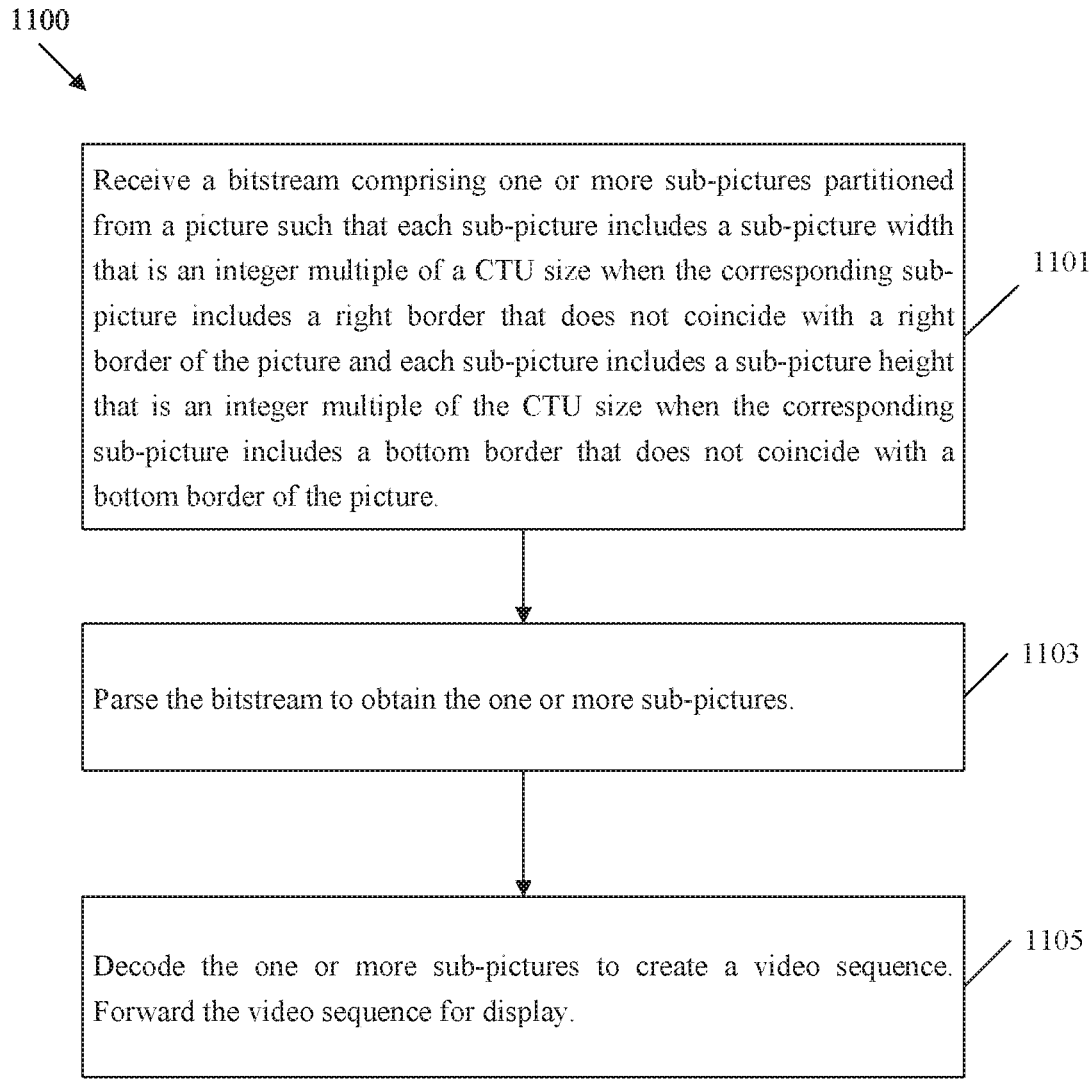
FIG. 11 is a flowchart of an example method of decoding a bitstream of sub-pictures with adaptive size constraints.

FIG. 11 is a flowchart of an example method 1100 of decoding a bitstream, such as bitstream 500 and/or sub-bitstream 501, of sub-pictures, such as sub-pictures 522, 523, 622, 722, and/or 822, with adaptive size constraints. Method 1100 may be employed by a decoder, such as a codec system 200, a decoder 400, and/or a video coding device 900 when performing method 100. For example, method 1100 may be applied to decode a bitstream created as a result of method 1000.

Method 1100 may begin when a decoder begins receiving a bitstream containing sub-pictures. The bitstream may include a complete video sequence or the bitstream may be a sub-bitstream containing a reduced set of sub-pictures for separate extraction. At step 1101, a bitstream is received. The bitstream comprises one or more sub-pictures partitioned from a picture according to an adaptive size constraint. The sub-pictures each include a sub-picture width and a sub-picture height. When a current sub-picture includes a right border that does not coincide with a right border of the picture, the sub-picture width of the current sub-picture is constrained to be an integer multiple of a CTU (e.g., sub-pictures 822 other than 822*b*). Accordingly, at least one of the sub-pictures (e.g., sub-pictures 822*b*) may include a sub-picture width that is not an integer multiple of the CTU size when the each sub-picture includes a right border that coincides with the right border of the picture. Further, when a current sub-picture includes a bottom border that does not coincide with a bottom border of the picture, the sub-picture height of the current sub-picture is constrained to be an integer multiple of a CTU (e.g., sub-pictures 822 other than 822*c*). Accordingly, at least one of the sub-pictures (e.g., sub-pictures 822*c*) may include a sub-picture height that is not an integer multiple of the CTU size when the each sub-picture includes a bottom border that coincides with the bottom border of the picture. This adaptive size constraint allows sub-pictures to be partitioned from a picture that includes a picture width that is not an integer multiple of the CTU size and/or a picture height that is not an integer multiple of the CTU size. The CTU size may be measured in units of luma samples.

At step 1103, the bitstream is parsed to obtain the one or more sub-pictures. At step 1105, the one or more sub-pictures are decoded to create a video sequence. The video sequence can then be forwarded for display. Hence, the adaptive size constraint allows sub-pictures to be partitioned from a picture with a height or width that is not a multiple of CTU size. Accordingly, the decoder can employ sub-picture based functionality, such as separate sub-picture extraction and/or display, on a picture with a height or width that is not a multiple of CTU size. As such, the application of adaptive size constraint increases the functionality of the decoder.

Figure 12:
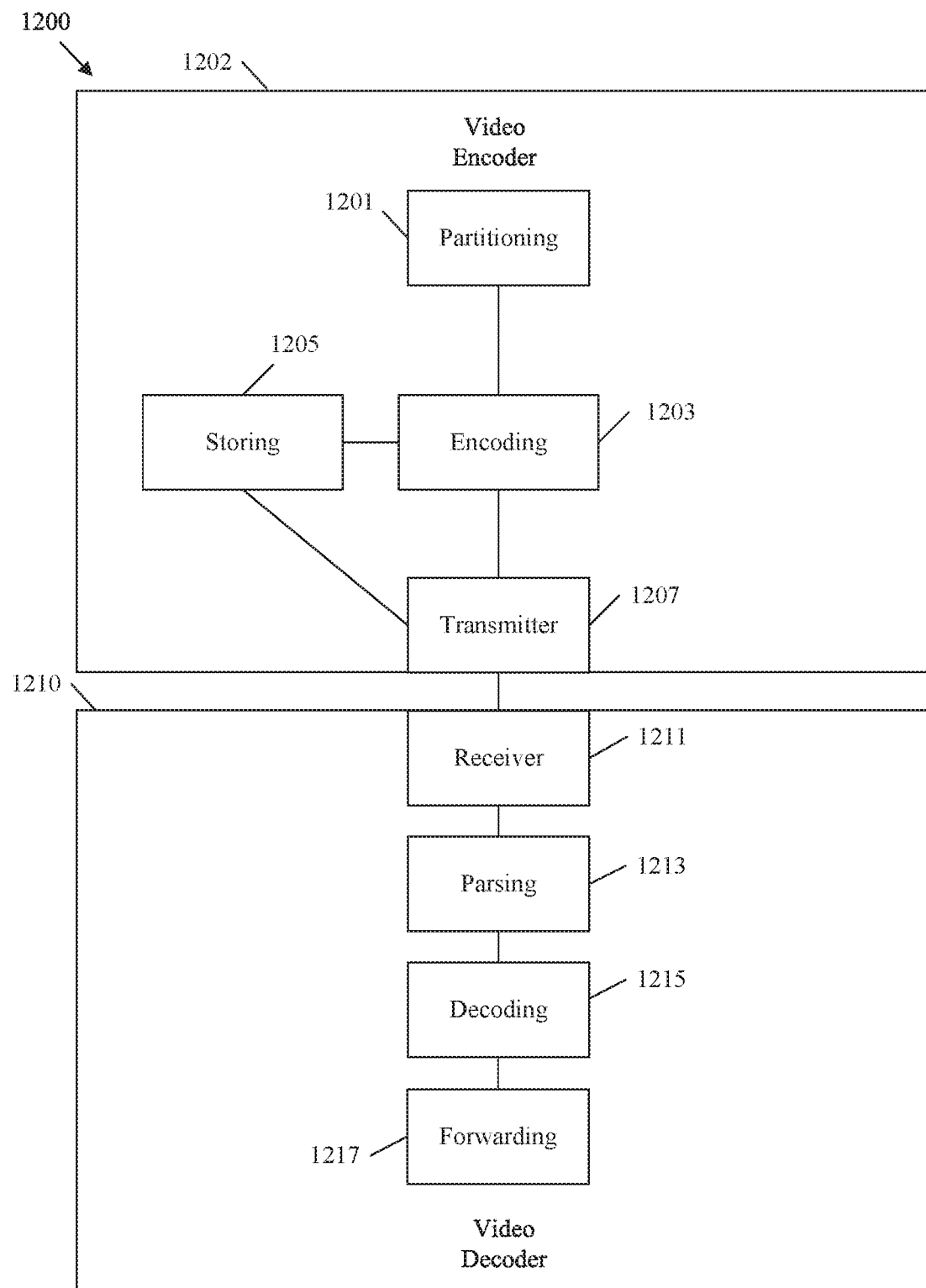
FIG. 12 is a schematic diagram of an example system for signaling a bitstream of sub-pictures with adaptive size constraints.

FIG. 12 is a schematic diagram of an example system 1200 for signaling a bitstream, such as bitstream 500 and/or sub-bitstream 501, of sub-pictures, such as sub-pictures 522, 523, 622, 722, and/or 822, with adaptive size constraints. System 1200 may be implemented by an encoder and a decoder such as a codec system 200, an encoder 300, a decoder 400, and/or a video coding device 900. Further, system 1200 may be employed when implementing method 100, 1000, and/or 1100.

The system 1200 includes a video encoder 1202. The video encoder 1202 comprises a partitioning module 1201 for partitioning a picture into a plurality of sub-pictures such that each sub-picture includes a sub-picture width that is an integer multiple of a CTU size when the each sub-picture includes a right border that does not coincide with a right border of the picture. The video encoder 1202 further comprises an encoding module 1203 for encoding one or more of the sub-pictures into a bitstream. The video encoder 1202 further comprises a storing module 1205 for storing the bitstream for communication toward a decoder. The video encoder 1202 further comprises a transmitting module 1207 for transmitting the bitstream including the sub-pictures toward the decoder. The video encoder 1202 may be further configured to perform any of the steps of method 1000.

The system 1200 also includes a video decoder 1210. The video decoder 1210 comprises a receiving module 1211 for receiving a bitstream comprising one or more sub-pictures partitioned from a picture such that each sub-picture includes a sub-picture width that is an integer multiple of a coding tree unit (CTU) size when the each sub-picture includes a right border that does not coincide with a right border of the picture. The video decoder 1210 further comprises a parsing module 1213 for parsing the bitstream to obtain the one or more sub-pictures. The video decoder 1210 further comprises a decoding module 1215 for decoding the one or more sub-pictures to create a video sequence. The video decoder 1210 further comprises a forwarding module 1217 for forwarding the video sequence for display. The video decoder 1210 may be further configured to perform any of the steps of method 1100.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in a by a decoder, the method comprising:
    receiving a bitstream comprising a sequence parameter set (SPS) and one or more sub-pictures partitioned from a picture such that a first sub-picture includes more than one slice and includes an incomplete coding tree unit (CTU) when the first sub-picture includes a right boundary that coincides with the right boundary of the picture, wherein the SPS comprises a sub-picture identifier (ID), a sub-picture size, and a sub-picture location for each of the one or more sub-pictures;
    parsing the bitstream to obtain the sub-picture ID, the sub-picture size, and the sub-picture location for each of the one or more sub-pictures;
    decoding the one or more sub-pictures to create a video sequence; and
    forwarding the video sequence for display.

2. The method of claim 1, wherein a second sub-picture comprises a sub-picture height that includes an integer number of complete CTUs when the second sub-picture includes a bottom boundary that does not coincide with a bottom boundary of the picture.

3. The method of claim 1, wherein a third sub-picture comprises a sub-picture width that includes an integer number of complete CTUs when the third sub-picture includes a right boundary that does not coincide with a right boundary of the picture.

4. The method of claim 1, wherein a fourth sub-picture comprises a sub-picture height that includes an incomplete CTU when the fourth sub-picture includes a bottom boundary that coincides with the bottom boundary of the picture.

5. A method implemented by a decoder, the method comprising:
    receiving a bitstream comprising a sequence parameter set (SPS) and a picture partitioned into sub-pictures, wherein at least one sub-picture includes more than one slice and includes an incomplete coding tree unit (CTU) when the at least one sub-picture includes a right boundary that coincides with the right boundary of the picture, wherein the SPS comprises a sub-picture identifier (ID), a sub-picture size, and a sub-picture location for each of the one or more sub-pictures;
    determining a partitioning of the picture into the sub-pictures; and
    decoding the picture based on the partitioning.

6. The method of claim 5, wherein each sub-picture includes a sub-picture height that is an integer multiple of a CTU size when each sub-picture includes a bottom boundary that does not coincide with a bottom boundary of the picture.

7. The method of claim 5, wherein each sub-picture includes a sub-picture width that is an integer multiple of a CTU size when each sub-picture includes a right boundary that does not coincide with a right boundary of the picture.

8. The method of claim 5, wherein at least one of the sub-pictures includes a sub-picture height that is not an integer multiple of a CTU size when each sub-picture includes a bottom boundary that coincides with the bottom boundary of the picture.

9. The method of claim 5, wherein the picture includes a picture width that is not an integer multiple of a CTU size.

10. The method of claim 5, wherein the picture includes a picture height that is not an integer multiple of a CTU size.

11. The method of claim 5, wherein a CTU size is measured in units of luma samples.

12. A decoder comprising:
    a receiver configured to receive a bitstream comprising a sequence parameter set (SPS) and a picture partitioned into sub-pictures, wherein at least one sub-picture includes more than one slice and includes an incomplete coding tree unit (CTU) when the at least one sub-picture includes a right boundary that coincides with the right boundary of the picture, wherein the SPS comprises a sub-picture identifier (ID), a sub-picture size, and a sub-picture location for each of the one or more sub-pictures; and
    a processor coupled to the receiver and configured to:
        determine a partitioning of the picture into the sub-pictures; and
        decode the picture based on the partitioning.

13. The decoder of claim 12, wherein each sub-picture includes a sub-picture height that is an integer multiple of a CTU size when each sub-picture includes a bottom boundary that does not coincide with a bottom boundary of the picture.

14. The decoder of claim 12, wherein each sub-picture includes a sub-picture width that is an integer multiple of a CTU size when each sub-picture includes a right boundary that does not coincide with a right boundary of the picture.

15. The decoder of claim 12, wherein at least one of the sub-pictures includes a sub-picture height that is not an integer multiple of a CTU size when each sub-picture includes a bottom boundary that coincides with the bottom boundary of the picture.

16. The decoder of claim 12, wherein the picture includes a picture width that is not an integer multiple of a CTU size.

17. The decoder of claim 12, wherein the picture includes a picture height that is not an integer multiple of a CTU size.

18. The decoder of claim 12, wherein a CTU size is measured in units of luma samples.

* * * * *

UNITED STATES PATENT AND TRADEMARK OFFICE
CERTIFICATE OF CORRECTION

PATENT NO. : 11,917,173 B2
APPLICATION NO. : 17/370913
DATED : February 27, 2024
INVENTOR(S) : Ye-Kui Wang et al.

It is certified that error appears in the above-identified patent and that said Letters Patent is hereby corrected as shown below:

In the Claims

Column 45, Claim 1, Lines 28-44, should read:
1. A method implemented by a decoder, the method comprising:
   receiving a bitstream comprising a sequence parameter set (SPS) and one or more sub-pictures partitioned from a picture such that a first sub-picture includes more than one slice and includes an incomplete coding tree unit (CTU) when the first sub-picture includes a right boundary that coincides with the right boundary of the picture, wherein the SPS comprises a sub-picture identifier (ID), a sub-picture size, and a sub-picture location for each of the one or more sub-pictures;
   parsing the bitstream to obtain the sub-picture ID, the sub-picture size, and the sub-picture location for each of the one or more sub-pictures;
   decoding the one or more sub-pictures to create a video sequence; and
forwarding the video sequence for display.

Signed and Sealed this
Thirtieth Day of April, 2024

Katherine Kelly Vidal
*Director of the United States Patent and Trademark Office*